United States Patent
Phan et al.

(10) Patent No.: US 11,694,123 B2
(45) Date of Patent: Jul. 4, 2023

(54) COMPUTER BASED OBJECT DETECTION WITHIN A VIDEO OR IMAGE

(71) Applicant: Future Health Works Ltd., Altrincham (GB)

(72) Inventors: Huy Quoc Phan, Fleet (GB); Thomas Harte, London (GB)

(73) Assignee: Future Health Works Ltd., Altrincham (GB)

(*) Notice: Subject to any disclaimer, the term of this patent is extended or adjusted under 35 U.S.C. 154(b) by 169 days.

(21) Appl. No.: 17/144,315

(22) Filed: Jan. 8, 2021

(65) Prior Publication Data

US 2021/0209397 A1    Jul. 8, 2021

Related U.S. Application Data

(63) Continuation of application No. 16/167,300, filed on Oct. 22, 2018, now Pat. No. 10,922,573.

(51) Int. Cl.

| | | |
|---|---|---|
| G06V 10/00 | (2022.01) | |
| G06N 20/10 | (2019.01) | |
| G06N 3/04 | (2023.01) | |
| G06N 7/01 | (2023.01) | |
| G06V 10/762 | (2022.01) | |
| G06V 10/82 | (2022.01) | |
| G06V 40/20 | (2022.01) | |
| G06V 10/44 | (2022.01) | |

(52) U.S. Cl.
CPC .............. *G06N 20/10* (2019.01); *G06N 3/04* (2013.01); *G06N 7/01* (2023.01); *G06V 10/763* (2022.01); *G06V 10/82* (2022.01); *G06V 40/23* (2022.01); *G06V 10/454* (2022.01)

(58) Field of Classification Search
CPC ............ G06N 3/08; G06N 3/04; G06N 20/10; G06N 7/005; G06N 99/005; G06K 9/3233; G06K 9/66; G06K 9/6254; G06K 9/6255; G06K 9/00389; G06K 9/00845; G04N 7/0145
See application file for complete search history.

(56) References Cited

U.S. PATENT DOCUMENTS

| | | |
|---|---|---|
| 5,465,308 A | 11/1995 | Hutcheson et al. |
| 8,296,247 B2 | 10/2012 | Zhang et al. |
| 8,345,101 B2 | 1/2013 | Bobbitt et al. |

(Continued)

FOREIGN PATENT DOCUMENTS

| | | |
|---|---|---|
| WO | WO-2012155077 A2 | 11/2012 |
| WO | WO-2019032692 A1 | 2/2019 |

OTHER PUBLICATIONS

Borji et al., Salient Object Detection: A Survey. Computational Visual Media 5(2): 117-150 (2014).

(Continued)

*Primary Examiner* — Amir Alavi
(74) *Attorney, Agent, or Firm* — Wilson Sonsini Goodrich & Rosati

(57) ABSTRACT

Described herein are software and systems for analyzing videos and/or images. Software and systems described herein are configured in different embodiments to carry out different types of analyses. For example, in some embodiments, software and systems described herein are configured to locate an object of interest within a video and/or image.

23 Claims, 10 Drawing Sheets

(56) References Cited

U.S. PATENT DOCUMENTS

| | | | |
|---|---|---|---|
| 8,571,273 B2 | 10/2013 | Li et al. | |
| 9,277,148 B2 | 3/2016 | Bovik et al. | |
| 9,474,481 B2 | 10/2016 | Dagum | |
| 9,922,432 B1 | 3/2018 | Risser | |
| 10,460,443 B2* | 10/2019 | Jeong | G06T 7/11 |
| 10,830,850 B2* | 11/2020 | Bi | A61B 5/055 |
| 10,872,262 B2* | 12/2020 | Yano | G06N 3/02 |
| 10,922,573 B2* | 2/2021 | Phan | G06N 20/10 |
| 11,036,989 B1* | 6/2021 | Assouline | A63F 13/55 |
| 11,069,150 B2* | 7/2021 | Sminchisescu | G06T 7/11 |
| 11,107,280 B1* | 8/2021 | Clohset | G06T 19/003 |
| 11,423,561 B2* | 8/2022 | Okami | G06N 3/08 |
| 11,482,048 B1* | 10/2022 | Diaz-Arias | G16H 20/30 |
| 2009/0125274 A1* | 5/2009 | Waldock | G05B 13/024 702/181 |
| 2013/0218529 A1 | 8/2013 | Vikstrom et al. | |
| 2017/0042467 A1* | 2/2017 | Herr | A61B 5/112 |
| 2017/0161891 A1 | 6/2017 | Madabhushi et al. | |
| 2018/0024641 A1 | 1/2018 | Mao et al. | |
| 2019/0213406 A1 | 7/2019 | Porikli et al. | |
| 2019/0244028 A1 | 8/2019 | Jones et al. | |
| 2019/0371080 A1* | 12/2019 | Sminchisescu | G06T 13/40 |

OTHER PUBLICATIONS

Damianou et al.: Variational Inference for Latent Variables and Uncertain Inputs in Gaussian Processes. The Journal of Machine Learning Research 17, 1, 1425-1486 (2016).

Junwei et al., Advanced Deep-Learning Techniques for Salient and Category-Specific Object Detection: A Survey. IEEE Signal Processing Magazine 35(1): 84-100 (2018).

McHutchson et al.: Gaussian process training with input noise. Advances in Neural Information Processing Systems, pp. 1341-1349 (2011).

PCT/EP2019/078563 International Search Report and Written Opinion dated Feb. 4, 2020.

Rasmussen, C.E.: Gaussian Processes in Machine Learning. Advanced lectures on machine learning. Springer, pp. 63-71 (2004).

Simonyan et al.: Very Deep Convolutional Networks for Large-Scale Image Recognition. International Conference on Learning Representations (2015).

U.S. Appl. No. 16/167,300 Non-Final Office Action dated May 28, 2020.

* cited by examiner

COMPUTER BASED OBJECT DETECTION WITHIN A VIDEO OR IMAGE

CROSS-REFERENCE

This application is a continuation of U.S. application Ser. No. 16/167,300, filed Oct. 22, 2018, now U.S. Pat. No. 10,922,573, the disclosure of which is hereby incorporated herein by reference for all purposes.

BACKGROUND

Videos and images containing one or more objects may be analyzed by computers utilizing software. For example, software is used to analyze videos or images in different applications.

Software used in some analysis systems includes machine learning algorithms which are trained to analyze videos or images using large datasets of videos or images.

SUMMARY OF THE INVENTION

Described herein are software and systems for analyzing videos and/or images. Software and systems described herein are configured in different embodiments to carry out different types of analyses. For example, in some embodiments, software and systems described herein are configured to locate an object of interest within a video and/or image. In some embodiments, an object of interest or factor of interest is located by the software and systems within a series of video frames and/or images. In some embodiments, a location of an object of interest or factor of interest relative to a different object within a video frame and/or image is identified. In some embodiments, software and systems described herein are configured to identify a factor of interest within a video and/or image. Non-limiting examples of factors of interest include colors, sizes, shapes, dimensions, velocity, distance, angles, ages, and weights. Factors of interest in some embodiments relate to an individual captured within at least one frame of a video or within an image. In some embodiments, factors of interest relate to an object captured within at least one frame of a video or within an image. In some embodiments, factors of interest relate to both an individual and an object captured within at least one frame of a video or within an image.

Powered by the recent advancements in artificial intelligence and big data research, objects and factors of interest can now be accurately estimated purely from monocular red, green, blue ("RGB") videos and images in a markerless manner. In some embodiments, analysis is based on various types of deep neural networks ("DNNs"), which train on large datasets of human images with ground-truth labeling for the diverse applications (e.g., defining joint locations, joint rotation, knee flexion and extension). Due to the memory-based learning nature, a DNN often performs poorly on images it has never seen before (i.e. never been trained on). Convolutional neural networks ("CNNs"), for example, may make predictions through videos or images, but the predictions may be inaccurate if the videos or images to be analyzed are poor quality. Additionally, researchers may have less control over how CNNs work and these machine learning algorithms typically don't take into account an uncertainty level around such predictions. That is, in these systems an analysis result is typically categorical and does not take into account uncertainty.

In contrast, in the methods and systems disclosed herein an analysis result may comprise outputs from multiple layers of a DNN to be used to predict a wide range of variables from a video or image input. Based on the theory of Bayesian analysis, prior knowledge is better incorporated into the machine learning framework, thus making it more specific to the testing scenario in hand. In some embodiments, preliminary experiments show that the methods disclosed herein can predict knee angle up to 2° as compared to a marker-based approach.

The software and systems described herein greatly improve upon traditional image analysis technology. Traditional image analysis technology typically comprises software which utilizes machine learning algorithms trained with large datasets of images and videos. Traditional technology is not particularly good at analyzing certain images where, for example, the machine learning algorithm was not trained with a similar image or video. That is, the traditional image analysis technology is poor at, for example, analyzing a video or image containing an object that it has not previously "seen" as part of its training. This poor performance in the traditional technology is compounded when an object that the technology is not familiar with has similar features to an object of interest or factor of interest. For example, when a traditional technology is used to identify a presence of a human knee within a video of a human individual, and the video contains a bench (or other jointed object) that was not contained within the training of the machine learning algorithm of the traditional technology, the traditional technology will mistake a joint in the bench for the object of interest or factor of interest, the knee of the human in the video. This particular exemplary shortcoming of the traditional video or image analyzing technology is at least in part associated with the inability to navigate uncertainty. That is, in the traditional video or image analysis technology, typically, an object within a video or image is either categorized as "yes" object of interest or "no" not object of interest based on previous training. However, no objects are categorized as falling between "yes" and "no" (i.e., objects that may be objects of interest but uncertainty exists). In contrast, in the instant software and systems, videos and/or images are analyzed using techniques that identify and address uncertainty and as such are more accurate and reliable in analyzing videos and images.

Described herein is a computer-based method for identifying an object of interest or factor of interest within a video, the method comprising:
(a) inputting the video comprising a plurality of frames into a software module,
(b) generating a feature map from a frame of the plurality of frames with the software module; and
(c) analyzing the feature map using a statistical technique thereby identifying the object of interest or factor of interest within the video.

In some embodiments, the software module comprises a DNN. In some embodiments, the feature map comprises data from hidden layers of the DNN. In some embodiments, the DNN comprises at least one of VGG-19, ResNet, Inception, and MobileNet. In some embodiments, the factor of interest comprises at least one of a location of a color within the frame and an angle within the frame. In some embodiments, the statistical technique comprises Monte-Carlo Sampling, and wherein the Monte-Carlo Sampling is used to sample the likelihood of the presence of the object of interest within the feature map. In some embodiments, the statistical technique further comprises Bayesian Modeling, and wherein the Bayesian Modeling is used to model a change in a location of the object of interest within the frame to a different location of the object of interest within a different frame of the plurality of frames. In some embodiments, the statistical technique further comprises identifying a position of the object of interest within the frame relative to a different object of interest within the frame. In some embodiments, the position of the object of interest within the frame is expressed as an angle. In some embodiments, the object of interest comprises a joint of a body of an individual. In some embodiments, the joint comprises a shoulder, elbow, hip, knee, or ankle. In some embodiments, the video captures the individual within the frame. In some embodiments, the video captures a factor of interest from the frame to a different frame within the plurality of frames. In some embodiments, the factor of interest comprises a movement of a joint. In some embodiments, the movement of the joint is measured relative to a different joint in the body of the individual and is expressed as an angle. In some embodiments, the angle is used by a healthcare provider to evaluate the individual.

Described herein is a computer-based system for identifying an object of interest or a factor of interest within a video, the system comprising:
(a) a processor; and
(b) a non-transitory medium comprising a computer program configured to cause the processor to:
  (i) input the video comprising a plurality of frames into a software module;
  (ii) generate a feature map using the software module; and
  (iii) analyze the feature map using a statistical technique thereby identifying the object of interest or the factor of interest within the video.

In some embodiments, the software module comprises a deep neural network. In some embodiments, the feature map comprises data from hidden layers of the deep neural network. In some embodiments, the deep neural network comprises at least one of VGG-19, ResNet, Inception, and MobileNet. In some embodiments, the factor of interest comprises at least one of a location of a color within the frame and an angle within the frame. In some embodiments, the statistical technique comprises Monte Carlo Sampling, and wherein the Monte Carlo Sampling is used to sample the likelihood of the presence of the object of interest within the feature map. In some embodiments, the statistical technique further comprises Bayesian Modeling, and wherein the Bayesian Modeling is used to model a change in a location of the object of interest within the frame to a different location of the object of interest within a different frame of the plurality of frames. In some embodiments, the statistical technique comprises identifying a position of the object of interest within the frame relative to a different object of interest within the frame. In some embodiments, the position of the object of interest within the frame is expressed as an angle. In some embodiments, the object of interest comprises a joint of a body of an individual. In some embodiments, the joint comprises a shoulder, elbow, shoulder, elbow, hip, knee, or ankle. In some embodiments, the video captures the individual within the frame. In some embodiments, the video captures a factor of interest from the frame to a different frame within the plurality of frames. In some embodiments, the factor of interest comprises a movement of a joint. In some embodiments, the movement of the joint is measured relative to a different joint of the body of the individual and is expressed as an angle. In some embodiments, the angle is used by a healthcare provider to evaluate the individual.

Described herein is a non-transitory medium comprising a computer program configured to:
(a) input a video comprising a plurality of frames into a software module;
(b) generate a feature map using the software module; and
(c) analyze the feature map using a statistical technique thereby identifying the object of interest or the factor of interest within the video.

In some embodiments, the software module comprises a deep neural network. In some embodiments, the feature map comprises data from hidden layers of the deep neural network. In some embodiments, the deep neural network comprises at least one of VGG-19, ResNet, Inception, and MobileNet. In some embodiments, the factor of interest comprises at least one of a location of a color within the frame and an angle within the frame. In some embodiments, the statistical technique comprises Monte Carlo Sampling, and wherein the Monte Carlo Sampling is used to sample the likelihood of the presence of the object of interest within the feature map. In some embodiments, the statistical technique further comprises Bayesian Modeling, and wherein the Bayesian Modeling is used to model a change in a location of the object of interest within the frame to a different location of the object of interest within a different frame of the plurality of frames. In some embodiments, the statistical technique comprises identifying a position of the object of interest within the frame relative to a different object of interest within the frame. In some embodiments, the position of the object of interest within the frame is expressed as an angle. In some embodiments, the object of interest comprises a joint of a body of an individual. In some embodiments, the joint comprises a shoulder, elbow, shoulder, elbow, hip, knee, or ankle. In some embodiments, the video captures the individual within the frame. In some embodiments, the video captures a factor of interest from the frame to a different frame within the plurality of frames. In some embodiments, the factor of interest comprises a movement of a joint. In some embodiments, the movement of the joint is measured relative to a different joint of the body of the individual and is expressed as an angle. In some embodiments, the angle is used by a healthcare provider to evaluate the individual.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
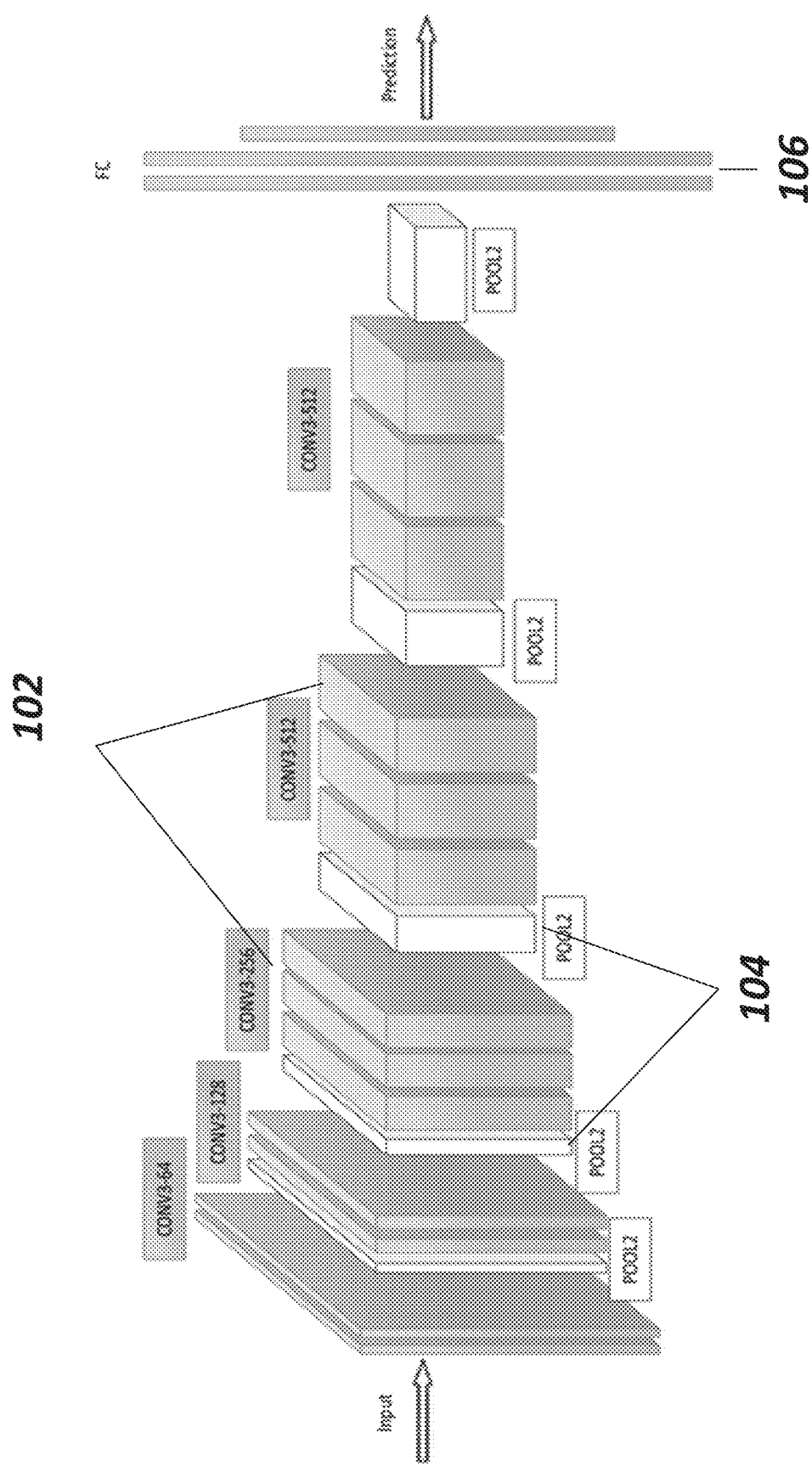
FIG. 1 shows an example of a CNN.

Described herein are software and systems configured to analyze videos and/or images with a high level of accuracy and reliability. In some embodiments, analysis generally occurs as follows: (1) a video and/or image is inputted into (and/or ingested by) a software algorithm such as a machine learning algorithm, (2) a representation such as a feature map comprising a probability of the existence of an object of interest or factor of interest within the video and/or image is created such as, for example, a heatmap, and (3) apply statistical techniques to the representation of likelihoods or probabilities to accurately identify the object of interest or factor of interest and determine the presence of the object of interest or factor of interest at a location within the video and/or image.

In some embodiments, the method disclosed herein comprises employing Markov-Chain Monte Carlo methods that exploit information from hidden neural network layers; producing noise-resistant and reliable predictions for joint angles/range of motion; providing confidence level (certainty) about predictions, which can prove useful in clinical applications.

In some embodiments, advantages of the method disclosed herein comprise: 1) building a relationship between powerful discriminative methods (such as deep CNNs) to a more well-studied and controllable Bayesian methods through sampling from feature maps such as, for example, heatmaps; 2) allowing predictions with uncertainty, which can be very important for clinical applications; 3) the framework is flexible enough to apply to any problem that relies on joint locations and object detection in general; and 4) as sampling methods approximate the true distribution, the prediction is usually more accurate.

Unless defined otherwise, all technical and scientific terms used herein have the same meaning as is commonly understood by one skilled in the art to which the claimed subject matter belongs. It is to be understood that the foregoing general description and the following detailed description are exemplary and explanatory only and are not restrictive of any subject matter claimed. In this application, the use of the singular includes the plural unless specifically stated otherwise.

In the present description, any percentage range, ratio range, or integer range is to be understood to include the value of any integer within the recited range and, when appropriate, fractions thereof (such as one tenth and one hundredth of an integer), unless otherwise indicated. It should be understood that the terms "a" and "an" as used herein refer to "one or more" of the enumerated components unless otherwise indicated or dictated by its context. The use of the alternative (e.g., "or") should be understood to mean either one, both, or any combination thereof of the alternatives. As used herein, the terms "include" and "comprise" are used synonymously.

The term "about" or "approximately" can mean within an acceptable error range for the particular value as determined by one of ordinary skill in the art, which will depend in part on how the value is measured or determined, e.g., the limitations of the measurement system. For example, "about" can mean plus or minus 10%, per the practice in the art. Alternatively, "about" can mean a range of plus or minus 20%, plus or minus 10%, plus or minus 5%, or plus or minus 1% of a given value. Where particular values are described in the application and claims, unless otherwise stated, the term "about" means within an acceptable error range for the particular value that should be assumed. Also, where ranges and/or subranges of values are provided, the ranges and/or subranges can include the endpoints of the ranges and/or subranges.

Data Input/Data Ingestion

In some embodiments of the software and systems described herein, data comprises, for example, a video or image to be analyzed that is inputted manually into the software or systems. The data may further comprise structured data, time-series data, unstructured data, and relational data. The unstructured data may comprise text, audio data, image data and/or video. The time-series data may comprise data from one or more of a smart meter, a smart appliance, a smart device, a monitoring system, a telemetry device, or a sensor. The relational data may comprise data from one or more of a customer system, an enterprise system, an operational system, a website, or web accessible application program interface (API). This may be done by a user through any method of inputting files or other data formats into software or systems.

In some embodiments, software and or systems as described herein comprise a data ingestion module configured to ingest data into a processing component. In some embodiments, a processing component comprises a machine learning algorithm.

In some embodiments, a data ingestion module is configured to either retrieve or receive data from one or more data sources, wherein retrieving data comprises a data extraction process and receiving data comprises receiving transmitted data from an electronic source of data.

For example, some embodiments of the platforms described herein are configured to retrieve or receive data from many different data sources such as wearable devices, cameras, smartphones, laptops, databases, and cloud storage systems. The wearable devices may comprise Fitbit, Apple Watch, Samsung Gear, Samsung Galaxy watch, Misfit, Xiaomi Mi band, and Microsoft band. In some embodiments, data that is ingested by the software or systems is sorted based on, for example, data type.

In some embodiments, the data is stored in a database. A database can be stored in computer readable format. A computer processor may be configured to access the data stored in the computer readable memory. A computer system may be used to analyze the data to obtain a result. The result may be stored remotely or internally on storage medium and communicated to personnel such as healthcare professionals. The computer system may be operatively coupled with components for transmitting the result. Components for transmitting can include wired and wireless components. Examples of wired communication components can include a Universal Serial Bus (USB) connection, a coaxial cable connection, an Ethernet cable such as a Cat5 or Cat6 cable, a fiber optic cable, or a telephone line. Examples of wireless communication components can include a Wi-Fi receiver, a component for accessing a mobile data standard such as a 3G or 4G LTE data signal, or a Bluetooth receiver. In some embodiments, all data in the storage medium are collected and archived to build a data warehouse.

In some embodiments, the database comprises an external database. The external database may be a medical database, for example, but not limited to, Adverse Drug Effects Database, American Hospital Formulary Service ("AHFS") Supplemental File, Allergen Picklist File, Average Wholesale Acquisiation Cost ("WAC") Pricing File, Brand Probability File, Canadian Drug File v2, Comprehensive Price History, Controlled Substances File, Drug Allergy Cross-Reference File, Drug Application File, Drug Dosing & Administration Database, Drug Image Database v2.0/Drug Imprint Database v2.0, Drug Inactive Date File, Drug Indications Database, Drug Lab Conflict Database, Drug Therapy Monitoring System ("DTMS") v2.2/DTMS Consumer Monographs, Duplicate Therapy Database, Federal Government Pricing File, Healthcare Common Procedure Coding System Codes ("HCPCS") Database, ICD-10 Mapping Files, Immunization Cross-Reference File, Integrated A to Z Drug Facts Module, Integrated Patient Education, Master Parameters Database, Medi-Span Electronic Drug File ("MED-File") v2, Medicaid Rebate File, Medicare Plans File, Medical Condition Picklist File, Medical Conditions Master Database, Medication Order Management Database ("MOMD"), Parameters to Monitor Database, Patient Safety Programs File, Payment Allowance Limit-Part B ("PAL-B") v2.0, Precautions Database, RxNorm Cross-Reference File, Standard Drug Identifiers Database, Substitution Groups File, Supplemental Names File, Uniform System of Classification Cross-Reference File, or Warning Label Database.

Machine Learning Algorithms

In some embodiments, a machine learning algorithm (or software module) of a platform as described herein utilizes one or more neural networks. In some embodiments, a neural network is a type of computational system that can learn the relationships between an input dataset and a target dataset. A neural network may be a software representation of a human neural system (e.g. cognitive system), intended to capture "learning" and "generalization" abilities as used by a human. In some embodiments, the machine learning algorithm (or software module) comprises a neural network comprising a CNN. Non-limiting examples of structural components of embodiments of the machine learning software described herein include: CNNs, recurrent neural networks, dilated CNNs, fully-connected neural networks, deep generative models, and Boltzmann machines.

In some embodiments, a neural network is comprised of a series of layers termed "neurons." In some embodiments, a neural network comprises an input layer, to which data is presented; one or more internal, and/or "hidden", layers; and an output layer. A neuron may be connected to neurons in other layers via connections that have weights, which are parameters that control the strength of the connection. The number of neurons in each layer may be related to the complexity of the problem to be solved. The minimum number of neurons required in a layer may be determined by the problem complexity, and the maximum number may be limited by the ability of the neural network to generalize. The input neurons may receive data being presented and then transmit that data to the first hidden layer through connections' weights, which are modified during training. The first hidden layer may process the data and transmit its result to the next layer through a second set of weighted connections. Each subsequent layer may "pool" the results from the previous layers into more complex relationships. In addition, whereas conventional software programs require writing specific instructions to perform a function, neural networks are programmed by training them with a known sample set and allowing them to modify themselves during (and after) training so as to provide a desired output such as an output value. After training, when a neural network is presented with new input data, it is configured to generalize what was "learned" during training and apply what was learned from training to the new previously unseen input data in order to generate an output associated with that input.

In some embodiments, the neural network comprises ANNs. ANN may be machine learning algorithms that may be trained to map an input dataset to an output dataset, where the ANN comprises an interconnected group of nodes organized into multiple layers of nodes. For example, the ANN architecture may comprise at least an input layer, one or more hidden layers, and an output layer. The ANN may comprise any total number of layers, and any number of hidden layers, where the hidden layers function as trainable feature extractors that allow mapping of a set of input data to an output value or set of output values. As used herein, a deep learning algorithm (such as a DNN) is an ANN comprising a plurality of hidden layers, e.g., two or more hidden layers. Each layer of the neural network may comprise a number of nodes (or "neurons"). A node receives input that comes either directly from the input data or the output of nodes in previous layers, and performs a specific operation, e.g., a summation operation. A connection from an input to a node is associated with a weight (or weighting factor). The node may sum up the products of all pairs of inputs and their associated weights. The weighted sum may be offset with a bias. The output of a node or neuron may be gated using a threshold or activation function. The activation function may be a linear or non-linear function. The activation function may be, for example, a rectified linear unit (ReLU) activation function, a Leaky ReLU activation function, or other function such as a saturating hyperbolic tangent, identity, binary step, logistic, arctan, softsign, parametric rectified linear unit, exponential linear unit, softplus, bent identity, softexponential, sinusoid, sinc, Gaussian, or sigmoid function, or any combination thereof.

The weighting factors, bias values, and threshold values, or other computational parameters of the neural network, may be "taught" or "learned" in a training phase using one or more sets of training data. For example, the parameters may be trained using the input data from a training dataset and a gradient descent or backward propagation method so that the output value(s) that the ANN computes are consistent with the examples included in the training dataset.

The number of nodes used in the input layer of the ANN or DNN may be at least about 10, 50, 100, 200, 300, 400, 500, 600, 700, 800, 900, 1000, 2000, 3000, 4000, 5000, 6000, 7000, 8000, 9000, 10,000, 20,000, 30,000, 40,000, 50,000, 60,000, 70,000, 80,000, 90,000, 100,000, or greater. In other instances, the number of node used in the input layer may be at most about 100,000, 90,000, 80,000, 70,000, 60,000, 50,000, 40,000, 30,000, 20,000, 10,000, 9000, 8000, 7000, 6000, 5000, 4000, 3000, 2000, 1000, 900, 800, 700, 600, 500, 400, 300, 200, 100, 50, 10, or less. In some instances, the total number of layers used in the ANN or DNN (including input and output layers) may be at least about 3, 4, 5, 10, 15, 20, or greater. In other instances, the total number of layers may be at most about 20, 15, 10, 5, 4, 3, or less.

In some instances, the total number of learnable or trainable parameters, e.g., weighting factors, biases, or threshold values, used in the ANN or DNN may be at least about 10, 50, 100, 200, 300, 400, 500, 600, 700, 800, 900, 1000, 2000, 3000, 4000, 5000, 6000, 7000, 8000, 9000, 10,000, 20,000, 30,000, 40,000, 50,000, 60,000, 70,000, 80,000, 90,000, 100,000, or greater. In other instances, the number of learnable parameters may be at most about 100,000, 90,000, 80,000, 70,000, 60,000, 50,000, 40,000, 30,000, 20,000, 10,000, 9000, 8000, 7000, 6000, 5000, 4000, 3000, 2000, 1000, 900, 800, 700, 600, 500, 400, 300, 200, 100, 50, 10, or less.

In some embodiments of a machine learning software module as described herein, a machine learning software module comprises a neural network such as a deep CNN. In some embodiments in which a CNN is used, the network is constructed with any number of convolutional layers, dilated layers or fully-connected layers. In some embodiments, the number of convolutional layers is between 1-10 and the dilated layers between 0-10. The total number of convolutional layers (including input and output layers) may be at least about 1, 2, 3, 4, 5, 10, 15, 20, or greater, and the total number of dilated layers may be at least about 1, 2, 3, 4, 5, 10, 15, 20, or greater. The total number of convolutional layers may be at most about 20, 15, 10, 5, 4, 3, or less, and the total number of dilated layers may be at most about 20, 15, 10, 5, 4, 3, or less. In some embodiments, the number of convolutional layers is between 1-10 and the fully-connected layers between 0-10. The total number of convolutional layers (including input and output layers) may be at least about 1, 2, 3, 4, 5, 10, 15, 20, or greater, and the total number of fully-connected layers may be at least about 1, 2, 3, 4, 5, 10, 15, 20, or greater. The total number of convolutional layers may be at most about 20, 15, 10, 5, 4, 3, 2, 1, or less, and the total number of fully-connected layers may be at most about 20, 15, 10, 5, 4, 3, 2, 1, or less.

In some embodiments, the input data for training of the ANN may comprise a variety of input values depending whether the machine learning algorithm is used for processing sensor signal data for a sensor device, a sensor panel, or a detection system of the present disclosure. The sensor device may comprise acoustic sensors, sound sensors, vibration sensors, chemical sensors, electric current sensors, magnetic sensors, radio sensors, moisture sensors, humidity sensors, flow sensors, radiation sensors, imaging sensors, light sensors, optical sensors, pressure sensors, density sensors, thermal sensors, heat sensors, temperature sensors, and proximity sensors. In general, the ANN or deep learning algorithm may be trained using one or more training datasets comprising the same or different sets of input and paired output data.

In some embodiments, a machine learning software module comprises a neural network comprising a CNN, RNN, dilated CNN, fully-connected neural networks, deep generative models and deep restricted Boltzmann machines.

In some embodiments, a machine learning algorithm comprises CNNs. The CNN may be deep and feedforward ANNs. The CNN may be applicable to analyzing visual imagery. The CNN may comprise an input, an output layer, and multiple hidden layers. The hidden layers of a CNN may comprise convolutional layers, pooling layers, fully-connected layers and normalization layers. The layers may be organized in 3 dimensions: width, height and depth.

The convolutional layers may apply a convolution operation to the input and pass results of the convolution operation to the next layer. For processing images, the convolution operation may reduce the number of free parameters, allowing the network to be deeper with fewer parameters. In neural networks, each neuron may receive input from some number of locations in the previous layer. In a convolutional layer, neurons may receive input from only a restricted subarea of the previous layer. The convolutional layer's parameters may comprise a set of learnable filters (or kernels). The learnable filters may have a small receptive field and extend through the full depth of the input volume. During the forward pass, each filter may be convolved across the width and height of the input volume, compute the dot product between the entries of the filter and the input, and produce a two-dimensional activation map of that filter. As a result, the network may learn filters that activate when it detects some specific type of feature at some spatial position in the input.

In some embodiments, the pooling layers comprise global pooling layers. The global pooling layers may combine the outputs of neuron clusters at one layer into a single neuron in the next layer. For example, max pooling layers may use the maximum value from each of a cluster of neurons in the prior layer; and average pooling layers may use the average value from each of a cluster of neurons at the prior layer.

In some embodiments, the fully-connected layers connect every neuron in one layer to every neuron in another layer. In neural networks, each neuron may receive input from some number locations in the previous layer. In a fully-connected layer, each neuron may receive input from every element of the previous layer.

In some embodiments, the normalization layer is a batch normalization layer. The batch normalization layer may improve the performance and stability of neural networks. The batch normalization layer may provide any layer in a neural network with inputs that are zero mean/unit variance. The advantages of using batch normalization layer may include faster trained networks, higher learning rates, easier to initialize weights, more activation functions viable, and simpler process of creating deep networks.

FIG. 1 shows an example of CNNs. In FIG. 1, a CNN architecture comprises a plurality of layers that transform the input into a prediction. The CNNs may comprise convolutional layers 102, pooling layers 104, and fully-connected layers 106. In FIG. 1, there are five sets of convolutional layers, and five pooling layers, each of which are in front of each set of convolutional layers. After the final pooling layer, there is at least one fully-connected layer.

In some embodiments, a machine learning software module comprises a recurrent neural network software module. A recurrent neural network software module may be configured to receive sequential data as an input, such as consecutive data inputs, and the recurrent neural network software module updates an internal state at every time step. A recurrent neural network can use internal state (memory) to process sequences of inputs. The recurrent neural network may be applicable to tasks such as handwriting recognition or speech recognition. The recurrent neural network may also be applicable to next word prediction, music composition, image captioning, time series anomaly detection, machine translation, scene labeling, and stock market prediction. A recurrent neural network may comprise fully recurrent neural network, independently recurrent neural network, Elman networks, Jordan networks, Echo state, neural history compressor, long short-term memory, gated recurrent unit, multiple timescales model, neural Turing machines, differentiable neural computer, and neural network pushdown automata.

In some embodiments, a machine learning software module comprises a supervised or unsupervised learning method such as, for example, support vector machines ("SVMs"), random forests, clustering algorithm (or software module), gradient boosting, logistic regression, and/or decision trees. The supervised learning algorithms may be algorithms that rely on the use of a set of labeled, paired training data examples to infer the relationship between an input data and output data. The unsupervised learning algorithms may be algorithms used to draw inferences from training datasets to the output data. The unsupervised learning algorithm may comprise cluster analysis, which may be used for exploratory data analysis to find hidden patterns or groupings in process data. One example of unsupervised learning method may comprise principal component analysis. The principal component analysis may comprise reducing the dimensionality of one or more variables. The dimensionality of a given variable may be at least 1, 5, 10, 50, 100, 200, 300, 400, 500, 600, 700, 800, 900, 1000, 1100, 1200 1300, 1400, 1500, 1600, 1700, 1800, or greater. The dimensionality of a given variables may be at most 1800, 1700, 1600, 1500, 1400, 1300, 1200, 1100, 1000, 900, 800, 700, 600, 500, 400, 300, 200, 100, 50, 10, or less.

In some embodiments, the machine learning algorithm may comprise reinforcement learning algorithms. The reinforcement learning algorithm may be used for optimizing Markov decision processes (i.e., mathematical models used for studying a wide range of optimization problems where future behavior cannot be accurately predicted from past behavior alone, but rather also depends on random chance or probability). One example of reinforcement learning may be Q-learning. Reinforcement learning algorithms may differ from supervised learning algorithms in that correct training data input/output pairs are never presented, nor are suboptimal actions explicitly corrected. The reinforcement learning algorithms may be implemented with a focus on real-time performance through finding a balance between exploration of possible outcomes (e.g., correct compound identification) based on updated input data and exploitation of past training.

In some embodiments, training data resides in a cloud-based database that is accessible from local and/or remote computer systems on which the machine learning-based sensor signal processing algorithms are running. The cloud-based database and associated software may be used for archiving electronic data, sharing electronic data, and analyzing electronic data. In some embodiments, training data generated locally may be uploaded to a cloud-based database, from which it may be accessed and used to train other machine learning-based detection systems at the same site or a different site. In some embodiments, sensor device and system test results generated locally may be uploaded to a cloud-based database and used to update the training dataset in real time for continuous improvement of sensor device and detection system test performance.

In some embodiments, a neural network comprises a DNN. In some embodiments, a neural network comprises a VGG-19 as, for example, described in SIMONYAN, K., AND ZISSERMAN, A. Very deep convolutional networks for large-scale image recognition. In *International Conference on Learning Representations* (2015). The DNN and VGG-19 are described elsewhere herein.

Representation of Likelihood

In some embodiments, the likelihood is presented by one-dimensional values (e.g., probabilities). The probability may be configured to measure the likelihood that an event may occur. The probability may range from about 0 and 1, 0.1 to 0.9, 0.2 to 0.8, 0.3 to 0.7, or 0.4 to 0.6. The higher the probability of an event, the more likely the event may occur. The event may comprise any type of situation, including, by way of non-limiting examples, whether a person will be sick based on his/her lifestyle, whether a certain day of the week will have rain whether a patient may be successfully treated, whether the unemployment rate may be increased in 3 months, or whether one pharmaceutical composition may have FDA approval.

In some embodiments, the likelihood is presented by two-dimensional values. The two-dimensional values may be presented by two-dimensional space, a feature map such as, for example, a heatmap, or spreadsheet. If the two-dimensional value is presented by a feature map such as, for example, a heatmap, the feature map such as, for example, a heatmap may show the likelihood that an event occurs in a location of the feature map such as, for example, a heatmap. In some embodiments, the likelihood is presented by multi-dimensional values.

Figure 2:
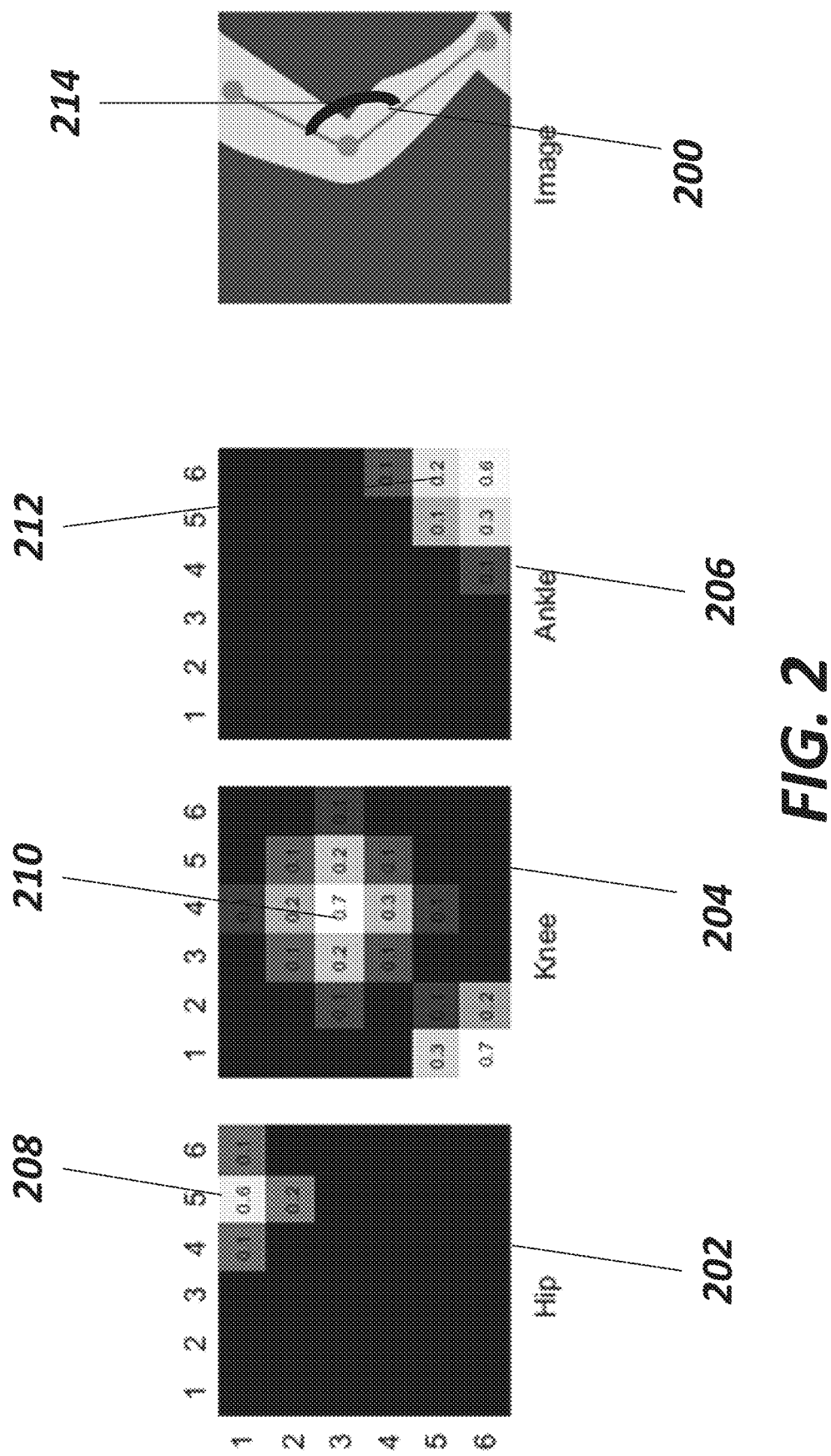
FIG. 2 shows exemplary heatmaps as a result of running a neural network on an input image.

FIG. 2 shows an exemplary feature map such as, for example, a heatmap as a result of running a neural network on an input image. The input image may have dimension 6×6×3, which means height, width and number of color channels, respectively. A neural network like the VGG-19 may then output an array of heatmaps of dimensions 6×6, one for each joint of interest. Each pixel in a heatmap represents the likelihood of having a certain joint appearing at that location. In FIG. 2, the input image 200 shows the image of a leg of a subject. The exemplary heatmaps comprise hip heatmap 202, knee heatmap 204, and ankle heatmap 206. The exemplary heatmaps may be obtained through a neural network. In the hip heatmap 202, the likelihood that the hip joint occurs at the position of column 5 and row 1 (208) is 0.6. In the knee heatmap 204, the likelihood that the knee joint occurs at the position of column 4 and row 3 (210) is 0.7. In the ankle heatmap 206, the likelihood that the ankle joint occurs at the position of column 6 and row 5 (212) is 0.2. The lower the number of the likelihood, the less chance that the joint (e.g., hip joint, knee joint, and ankle joint) occurs in the location on the heatmap.

Statistical Techniques

Provided herein are statistical techniques used to obtain one or more PDFs. In some embodiments, statistical techniques are applied to identify the risk factors for cancer, classify a recorded phoneme, predict whether a subject may have a certain disease based on a subject's physical information, customize an email spam detection system, classify a tissue sample into one of several cancer classes, or establish the relationship between salary and demographic variables.

In some embodiments, statistical techniques comprise linear regression, classification, resampling methods, subset selection, shrinkage, dimension reduction, nonlinear models, tree-based methods, support vector machines, and unsupervised learning.

In some embodiments, linear regression is used as a method to predict a target variable by fitting the best linear relationship between the dependent and independent variable. In some embodiments, the best fit means that the sum of all the distances between the shape and the actual observations at each point is the least. Linear regression may comprise simple linear regression and multiple linear regression. The simple linear regression may use a single independent variable to predict a dependent variable. The multiple linear regression may use more than one independent variables to predict a dependent variable by fitting a best linear relationship. For instance, a dataset comprises ratings of multiple cereals, the number of grams of sugar contained in each serving, and the number of grams of fat contained in each serving; and a simple linear regression model uses the number of grams of sugar as the independent variable and rating as the dependent variable. For the same dataset, a multiple linear regression model uses the number of grams of sugar and the number of grams of fat as the independent variables and rating as the dependent variable.

In some embodiments, classification is a data mining technique that assigns categories to a collection of data in order to achieve accurate predictions and analysis. For example, a classification model is used to identify loan applicants as low, medium, or high credit risks. Classification techniques may comprise logistic regression and discriminant analysis. Logistic regression may be used when the dependent variable is dichotomous (binary). Logistic regression may be used to discover and describe the relationship between one dependent binary variable and one or more nominal, ordinal, interval or ratio-level independent variables.

In some embodiments, discriminant analysis is used where two or more groups, clusters or populations are known a priori and one or more new observations are classified into one of the known populations based on the measured characteristics. For instance, a discriminant model is used to determine employees' different personality types based on data collected on employees in three different job classifications: 1) customer service personnel, 2) mechanics; and 3) dispatchers. Discriminant analysis may comprise linear discriminant analysis and quadratic discriminant analysis. Linear discriminant analysis may compute "discriminant scores" for each observation to classify what response variable class it is in. Quadratic discriminant analysis may assume that each class has its own covariance matrix.

In some embodiments, resampling is a method comprising drawing repeated samples from the original data samples. The resampling may not involve the utilization of the generic distribution tables in order to compute approximate probability values. The resampling may generate a unique sampling distribution on the basis of the actual data. In some embodiments, the resampling may use experimental methods, rather than analytical methods, to generate the unique sampling distribution. The resampling techniques may comprise bootstrapping and cross-validation. Bootstrapping may be performed by sampling with replacements from the original data and taking the "not chosen" data points as test cases. Cross validation may be performed by splitting the training data into a plurality of parts.

In some embodiments, subset selection identifies a subset of predictors related to the response. The subset selection may comprise best-subset selection, forward stepwise selection, backward stepwise selection, and hybrid method. In some embodiments, shrinkage fits a model involving all predictors, but the estimated coefficients are shrunken towards zero relative to the least squares estimates. This shrinkage may reduce variance. The shrinkage may comprise ridge regression and the lasso.

In some embodiments, dimension reduction reduces the problem of estimating p+1 coefficients to the simple problem of M+1 coefficients, where M<p. It may be attained by computing M different linear combinations or projections of the variables. Then these M projections are used as predictors to fit a linear regression model by least squares. Dimension reduction may comprise principal component regression and partial least squares. The principal component regression may be used to derive a low-dimensional set of features from a large set of variables. The principal components used in the principal component regression may capture the most variance in the data using linear combinations of the data in subsequently orthogonal directions. The partial least squares method may be a supervised alternative to principal component regression because partial least squares may make use of the response variable in order to identify the new features.

In some embodiments, nonlinear regression is a form of regression analysis in which observational data are modeled by a function which is a nonlinear combination of the model parameters and depends on one or more independent variables. The nonlinear regression may comprise step function, piecewise function, spline, and generalized additive model.

In some embodiments, tree-based methods are used for both regression and classification problems. The regression and classification problems may involve stratifying or segmenting the predictor space into a number of simple regions. The tree-based methods may comprise bagging, boosting, and random forest. The bagging may decrease the variance of prediction by generating additional data for training from original dataset using combinations with repetitions to produce multistep of the same carnality/size as the original data. The boosting may calculate the output using several different models and then average the result using a weighted average approach. The random forest algorithm may draw random bootstrap samples of the training set.

In some embodiments, support vector machines are classification techniques listed under supervised learning models in machine learning. Support vector machines may comprise finding the hyperplane (a hyperplane may be an m-dimensional subspace of an n-dimensional space, where m=n−1) that best separates two classes of points with the maximum margin. The support vector machines may be a constrained optimization problem where the margin is maximized subject to the constraint that it perfectly classifies the data.

Unsupervised methods may be methods to draw inferences from datasets comprising input data without labeled responses. The unsupervised methods may comprise clustering, principal component analysis, k-Mean clustering, and hierarchical clustering.

In some embodiments, the statistical techniques comprise a Monte Carlo sampling method. The Monte Carlo sampling method may comprise one or more computational algorithms that rely on repeated random sampling to obtain numerical results. The Monte Carlo sampling method may apply to optimization, numerical integration, and generation of draws from a probability distribution.

The Monte Carlo sampling method may be applied to stochastic problems by nature, for example, particle transport, telephone and other communication systems, and population studies based on the statistics of survival and reproduction. The Monte Carlo sampling method may also be applied to deterministic problems by nature, for example, the evaluation of integrals, solving the systems of algebraic equations, and solving partial differential equations.

The Monte Carlo sampling method may comprise the following steps: 1) defining a domain of possible inputs; 2) generating inputs randomly from a probability distribution over the domain; 3) performing a deterministic computation on the inputs; and 4) aggregating the results.

The Monte Carlo sampling method may comprise: 1) PDFs by which a physical (or mathematical) system is described; 2) random number generator, which means a source of random numbers uniformly distributed on the unit interval that are available; 3) sampling rule demonstrating a prescription for sampling from the specified PDF, assuming the availability of random numbers on the unit interval; 4) scoring (or tallying), whereby the outcomes may be accumulated into overall tallies or scores for the quantities of interest; 5) error estimation, typically shown as a function of the number of trials and other quantities; 6) variance reduction techniques, comprising methods for reducing the variance in the estimated solution to reduce the computational time for Monte Carlo simulation; and 7) parallelization and vectorization, including efficient use of advanced computer architectures.

Approximating the PDF for Locations of Objects of Interest from a Single Heatmap In some embodiments, the locations of objects of interest are approximated by the Monte Carlo sampling method. In some embodiments, the objects of interest comprise one or more devices, the locations of which are used for analysis of usage, marketing, or other financial or business purposes. The one or more devices may comprise any type of device, for example, but not limited to, consumer electronics, telecommunication devices, office devices, agricultural devices, lights, household equipment, safety equipment, or medical equipment. The consumer electronics may comprise TVs, photo equipment and accessories, cameras (video or film), speaker, radio/hi-fi systems, or video projectors. The telecommunication devices may comprise mobile phones, modems, router, phone cards, or telephones. The office devices may comprise shredders, faxes, copiers, projectors, cutting machine, and typewriters. The agricultural devices may comprise tractor, cultivator, chisel plow, harrow, subsoiler, rotator, roller, trowel, seed drill, liquid manure spreader, sprayer, sprinkler system, produce sorter, farm truck, grain dryer, conveyor belt, mower, hay rake, bulk tank, milking machine, grinder-mixture, or livestock trailer. The household devices may comprise cooler, blender, fan, refrigerator, heater, oven, air-conditioner, dishwasher, washer and dryer, vacuum cleaner, and microwave. The safety equipment may comprise rescue equipment, carbon monoxide detector, surveillance cameras, and surveillance monitors. The medical equipment may comprise stethoscope, suction device, thermometer, tongue depressor, transfusion kit, tuning fork, ventilator, watch, stopwatch, weighing scale, crocodile forceps, bedpan, cannula, cardioverter, defibrillator, catheter, dialyzer, electrocardiograph machine, enema equipment, endoscope, gas cylinder, gauze sponge, hypodermic needle, syringe, infection control equipment, an oximeter or oximeters that monitors oxygen levels of the user, instrument sterilizer, kidney dish, measuring tape, medical halogen penlight, nasogastric tube, nebulizer, ophthalmoscope, otoscope, oxygen mask and tubes, pipette, dropper, proctoscope, reflex hammer, and sphygmomanometer.

In some embodiments, the objects of interest comprise transportation systems, the locations of which are used for analysis of transportation and infrastructure. The transportation system may comprise, by way of non-limiting examples, an aircraft, airplane, automobile, battleship, bus, bullet train, bike, cab, canoe, cargo ship, compact car, truck, elevated railroad, ferry, fishing boat, jet boat, kayak, limo, minibus, minivan, sail boat, school bus, tank, train, van, or yacht.

In some embodiments, the objects of interest comprise organs of a subject. The subject may be any living beings, for example, amphibians, reptiles, birds, mammals, fishes, insects, spiders, crabs, or snails. The organ may include, by way of non-limiting examples, mouth, tongue, stomach, liver, pancreas, small intestine, large intestine, pharynx, lungs, kidney, uterus, heart, eye, ear, bones, joints, and skin. In some embodiments, the objects of interest comprise tissue of a subject. A tissue may be a sample that is healthy, benign, or otherwise free of a disease. A tissue may be a sample removed from a subject, such as a tissue biopsy, a tissue resection, an aspirate (such as a fine needle aspirate), a tissue washing, a cytology specimen, a bodily fluid, or any combination thereof. A tissue may comprise neurons. A tissue may comprise brain tissue, spinal tissue, or a combination thereof. A tissue may comprise cells representative of a blood-brain barrier. A tissue may comprise a breast tissue, bladder tissue, kidney tissue, liver tissue, colon tissue, thyroid tissue, cervical tissue, prostate tissue, lung tissue, heart tissue, muscle tissue, pancreas tissue, anal tissue, bile duct tissue, a bone tissue, uterine tissue, ovarian tissue, endometrial tissue, vaginal tissue, vulvar tissue, stomach tissue, ocular tissue, nasal tissue, sinus tissue, penile tissue, salivary gland tissue, gut tissue, gallbladder tissue, gastrointestinal tissue, bladder tissue, brain tissue, spinal tissue, or a blood sample.

In some embodiments, the objects of interest comprise small units of ordinary matter, the locations of which are used for scientific research. The small units of ordinary matter may comprise atom, nucleus, electrons, neutrons, protons, and ions.

In one example, the Monte Carlo sampling method is used to approximate the PDF for joint location from a single heatmap. The heatmap Ti may comprise dimensions N×N for joint i. N may be at least 1, 2, 3, 4, 5, 6, 7, 8, 9, 10, or greater. In other embodiments, N may be at most 10, 9, 8, 7, 6, 5, 4, 3, 2, 1, or less. The joint may comprise hand joints, elbow joints, wrist joints, axillary articulations, stemoclavicular joints, vertebral articulations, temporomandibular joints, sacroiliac joints, hip joints, knee joints, and articulations of foot. The letter i may represent different types of joints. For instance, when i=1, the joint may be hand joints; and when i=2, the joint may be elbow joints. Thus, the heatmap $\Psi_1$ can represent the likelihood of hand joints locations; and the heatmap $\Psi_2$ can represent the likelihood of elbow joints locations.

The heatmap can be used to approximate the distribution function $p(x_i|\Psi_i)$ of joint locations for joint i. Since the heatmap may be complicated, a standard model can be superimposed. The Monte Carlo sampling method may be used to approximate the distribution of joint locations by alternatively sampling from rows and columns of a heatmap. In the example, the mean joint location can be approximated by following the steps.

First, given heatmap $\Psi_i$, mean location $\mu_i$ for joint i is designated to be calculated. The joint may comprise hand joints, elbow joints, wrist joints, axillary articulations, stemoclavicular joints, vertebral articulations, temporomandibular joints, sacroiliac joints, hip joints, knee joints, and articulations of foot.

Second, $x^1=[x_1, x_2]$ is initialized by sampling from a uniform distribution. In some embodiments, distributions other than the uniform distribution can be used to initialize $x^1=[x_1, x_2]$. For example, the other distributions include, but are not limited to, the Bernoulli distribution, the Rademacher distribution, the binomial distribution, the beta-binomial distribution, the degenerate distribution, the discrete uniform distribution, the hypergeometric distribution, the Poisson binomial distribution, the Fisher's noncentral hypergeometric distribution, Wallenius' noncentral hypergeometric distribution, the beta negative binomial distribution, the Boltzmann distribution, the Gibbs distribution, the Maxwell-Boltzmann distribution, the Borel distribution, the extended negative binomial distribution, the extended hypergeometric distribution, the generalized log-series distribution, the geometric distribution, the logarithmic (series) distribution, the negative binomial distribution, the discrete compound Poisson distribution, the parabolic fractal distribution, the Poisson distribution, the Conway-Maxwell-Poisson distribution, the zero-truncated Poisson distribution, the Polya-Eggenberger distribution, the Skellam distribution, the skew elliptical distribution, the Yule-Simon distribution, the zeta distribution, the Zipf distribution, the Behrens-Fisher distribution, the Cauchy distribution, the Chernoff's distribution, the Exponentially modified Gaussian distribution, the Fisher's z-distribution, the skewed generalized t-distribution, the generalized logistic distribution, the generalized normal distribution, the geometric stable distribution, the Gumbel distribution, the Holtsmark distribution, the hyperbolic distribution, the hyperbolic secant distribution, the Johnson SU distribution, the Landau distribution, the Laplace distribution, the Levy skew alpha-stable distribution, the Linnik distribution, the logistic distribution, the map-Airy distribution, the normal distribution, the normal-exponential-gamma distribution, the normal-inverse Gaussian distribution, the Pearson Type IV distribution, the skew normal distribution, the Student's t-distribution, useful for estimating unknown means of Gaussian populations, the noncentral t-distribution, the skew t-distribution, the Champernowne distribution, the type-1 Gumbel distribution, the Tracy-Widom distribution, the Voigt distribution, the beta prime distribution, the Birnbaum-Saunders distribution, the chi distribution, the noncentral chi distribution, the chi-squared distribution, the inverse-chi-squared distribution, the noncentral chi-squared distribution, the scaled inverse chi-squared distribution, the Dagum distribution, the exponential distribution, the exponential-logarithmic distribution, the F-distribution, the noncentral F-distribution, the folded normal distribution, the Frechet distribution, the Gamma distribution, the Erlang distribution, the inverse-Gamma distribution, the generalized gamma distribution, the generalized Pareto distribution, the Gamma/Gompertz distribution, the Gompertz distribution, the half-normal distribution, the Hotelling's T-squared distribution, the inverse Gaussian distribution, the Levy distribution, the log-Cauchy distribution, the log-Laplace distribution, the log-logistic distribution, the Lomax distribution, the Mittag-Leffler distribution, the Nakagami distribution, the Pareto distribution, the Pearson Type III distribution, the phase-type distribution, used in queueing theory, the phased bi-exponential distribution, the phased bi-Weibull distribution, the Rayleigh distribution, the Rayleigh mixture distribution, the Rice distribution, the shifted Gompertz distribution, the type-2 Gumbel distribution, and the Weibull distribution.

In some embodiments, for $x^1=[x_1\ x_2]$, the $x_1$ may represent a column in a heatmap, and the $x_2$ may represent a row in a heatmap. For example, if the heatmap is 8×7, the $x_1$ may have the value ranging from 1 to 8, and the $x_2$ may have the value ranging from 1 to 7. The process of initialization may be the assignment of an initial value for a variable, e.g., $x^1$. The uniform distribution may be the continuous uniform distribution. The continuous uniform distribution may be symmetric probability distributions such that for each member of the family, all intervals of the same length on the distribution's support are equally probable.

Third, for t=1 . . . T:

$x_1^{t+1} \sim p(x_1|x_2^t) = \text{Categorical}(\psi x_2^t,:/|\psi x_2^t,:|)$, where $\psi x_2^t$,: is row $x_2^t$ of $\psi$ $x_2^{t+1} \sim p(x_2|x_1^{t+1}) = \text{Categorical}(\psi:,x_1^{t+1}/|\psi:,x_1^{t+1}|)$, where $\psi:,x_1^{t+1}$ is column $x_1^{t+1}$ of $\psi$ In some embodiments, the t represents the time. In some embodiments, T is at least 1, 2, 3, 4, 5, 6, 7, 8, 9, 10, or greater. In other embodiments, T is at most 10, 9, 8, 7, 6, 5, 4, 3, 2, 1, or less. In some embodiments, categorical means a categorical distribution, which is a discrete probability distribution that describes the possible results of a random variable that can take on one of multiple possible categories, with the probability of each category separately specified. In some embodiments, the categorical distribution is the generalization of the Bernoulli distribution for a categorical random variable, i.e. for a discrete variable with more than two possible outcomes, such as the roll of a die. On the other hand, the categorical distribution is a special case of the multinomial distribution, in that it gives the probabilities of potential outcomes of a single drawing rather than multiple drawings. In some embodiments, the distribution of $x_1^{t+1}$ is $p(x_1|x_2^t)$, which shows the likelihood of $x_1$ under the condition of $x_2^t$. In some embodiments, $x_2^t$ shows a row of the heatmap at the time t. In some embodiments, the distribution of $x_2^{t+1}$ is $p(x_2|x_1^{t+1})$, which shows the likelihood of $x_2$ under the condition of $x_1^{t+1}$. In some embodiments, $x_1^{t+1}$ shows a column of the heatmap at the time t+1.

After the above three steps, the expectation value and covariance value may be calculated. The equations for calculating expectation value and covariance value may be $$E[x_1] = \frac{1}{T}\sum_{t=1}^{T} x_l^t$$

and $\text{cov}[x_i,x_j] = E_{xi,xj}[x_ix_j] - E[x_i]E[x_j]$.

Figure 3:
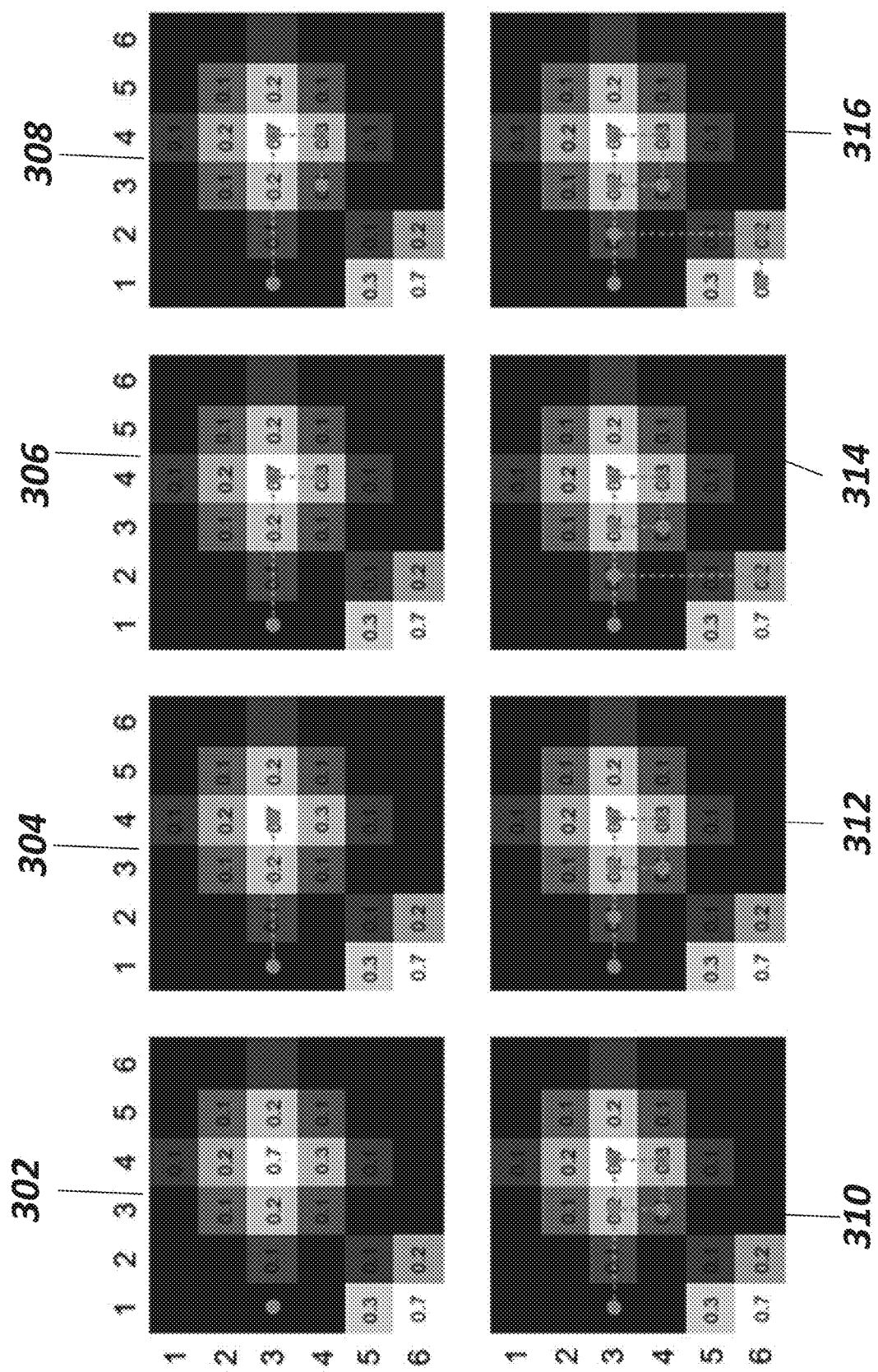
FIG. 3 shows visual examples of the Monte Carlo sampling method on a small scale heatmap.

FIG. 3 shows the visual examples of the Monte Carlo sampling method on small scale heatmap. All the heatmaps in FIG. 3 (302-316) represent a single heatmap but at different times. For instance, heatmap 302 represents the single heatmap at t=1, heatmap 304 represents the single heatmap at t=2, heatmap 306 represents the single heatmap at t=3, heatmap 308 represents the single heatmap at t=4, heatmap 310 represents the single heatmap at t=5, heatmap 312 represents the single heatmap at t=6, heatmap 314 represents the single heatmap at t=7, and heatmap 316 represents the single heatmap at t=8. The process of Monte Carlo sampling method may start from heatmap 302. The dot located at column 1 and row 3 may be the starting point, which means x½=3. The likelihood of the location may be used to calculate the next move of the dot, $x_1^2$, by using a distribution parametrized by row 3 of the heatmap 302, which is the equation shown in step three. In details, $x_1^2 \sim \text{Categorical}([0.0.10.2\ 0.7\ 0.2\ 0.]/1.2)$, which gives next step $x_1^2=4$. Thus, the next move of the dot may be at column 4 and row 3, which shows in the heatmap 304. Next, the likelihood of the location may be used to calculate the next move of the dot by using a distribution parametrized by column 4 of the heatmap 304: $x_2^2 \sim \text{Categorical}([0.1\ 0.2\ 0.7\ 0.3\ 0.1\ 0.]/1.4$, which gives $x_2^2=4$. Thus, the next move of the dot may be at column 4 and row 4, which shows in the heatmap 306. The process may be continued. For instance, the move of the dot shown in heatmap 308 may be at column 3 and row 4; the move of the dot show in heatmap 310 may be at column 3 and row 3; the move of the dot shown in heatmap 312 may be at column 2 and row 3; the move of the dot shown in heatmap 314 may be at column 2 and row 6; and the move of the dot shown in heatmap 316 may be at column 1 and row 6. With a sufficient number of iterations, the algorithm may be used to accurately approximate the distribution of joint locations represented by the single heatmap.

Alternative Methods to Sample from Rows and Columns of a Heatmap

In some cases, where row or column vectors $\Psi_i$ cannot be normalized easily by dividing them by their sums, other methods can be used. In some embodiments, the other methods comprise Gumbel-max trick and softmax trick.

For the softmax trick, $\Psi_k$ can be a single element in a row or column vector $\Psi_i$ of K elements. Using the softmax trick, vector elements can be first normalized by $$\Psi_k = \frac{\exp \Psi_k}{\sum_{j=1}^{j=K} \exp \Psi_j},$$

and then discrete values x can be drawn from the Categorical distribution parameterized by $\{\Psi_k\}$.

To draw samples using the Gumbel-max trick, the discrete values can be computed with $x = \mathrm{argmax}_{k \in \{1 \ldots K\}} \Psi_k + g_k$, where $\{g_k\}$ are independent and identically drawn from the Gumbel distribution Gumbel(0, 1).

Approximating PDF for Functions of Locations of Objects of Interest from a Single Heatmap By using the Monte Carlo sampling method, it is easy to extend the procedure above to approximate the PDF of any function that takes locations as input. In some embodiments, the function is relevant to the locations of one or more devices. In this situation, the function may represent the movement of the device at different times, the relative location of two or more devices at the same time, or the ratio of usage of one or more devices at the same time. In some embodiments, the function is relevant to one or more organs of a same subject. In this situation, the function may represent the distance between different organs. In some embodiments, the function is relevant to one or more organs of different subject. In this situation, the function may represent the distance between different organs of different subjects, the relationship between different subjects, and the proximity of different subjects. In some embodiments, the function is relevant to locations of small units of ordinary matter. In this situation, the function may present the movement of small units of ordinary matter, or the relative locations of small units of ordinary matter.

In one example, the Monte Carlo sampling method can be used to approximate the PDF of any function that takes joint locations as input. In some embodiments, the following steps show how to compute the mean and variance of joint angle given individual detection heatmaps for each joint.

First, given heatmaps $\Psi_A$, $\Psi_B$, $\Psi_C$, mean p and variance a for joint angle $f_B$ are designed to be calculated. The A, B, C may represent different joints disclosed elsewhere herein. In this example, A represents hip joints, B represents knee joints, and C represents ankle joints. In this situation, the joint angle is 214 in FIG. 2.

Second, $x^1 = [x_A \; x_B \; x_C]$ is initialized, where $x_A = [x_1 \; x_2]$, $x_B = [x_3 \; x_4]$, and $x_C = [x_5 \; x_6]$, are 2D locations each joints A, B, C, by sampling from a uniform distribution. Other distributions disclosed elsewhere herein can also be used to initialize $x^1 = [x_A \; x_B \; x_C]$.

In some embodiments, for $x_A = [x_1 \; x_2]$, the $x_1$ represents a column in a heatmap, and the $x_2$ represents a row in a heatmap. For example, if the heatmap is 8×7, the $x_1$ may have the value ranging from 1 to 8, and the $x_2$ may have the value ranging from 1 to 7. The process of initialization may be the assignment of an initial value for a variable, e.g., $x_A$. In some embodiments, for $x_B = [x_3 \; x_4]$, the $x_3$ represents a column in a heatmap, and the $x_4$ represents a row in a heatmap. In some embodiments, for $x_C = [x_5 \; x_6]$, the $x_5$ represents a column in a heatmap, and the $x_6$ represents a row in a heatmap. The uniform distribution may be the continuous uniform distribution. The continuous uniform distribution may be symmetric probability distributions such that for each member of the family, all intervals of the same length on the distribution's support are equally probable.

Third, for $t = 1 \ldots T$:

$x_1^{t+1} \sim p(x_1 | x_2^t) = \mathrm{Categorical}(\psi x_2^t,:/|\psi x_2^t,:|)$, where $\psi x_2^t$, is row $x_2^t$ of $\psi_A$ $x_2^{t+1} \sim p(x_2 | x_1^{t+1}) = \mathrm{Categorical}(\psi:,x_1^{t+1}/|\psi:,x_1^{t+1}|)$, where $\psi:,x_1^{t+1}$ is column $x_1^{t+1}$ of $\psi_A$ $x_3^{t+1} \sim p(x_3 | x_4^t) = \mathrm{Categorical}(\psi x_4^t,:/|\psi x_4^t,:|)$, where $\psi x_4^t$, is row $x_4^t$ of $\psi_B$ $x_4^{t+1} \sim p(x_4 | x_3^{t+1}) = \mathrm{Categorical}(\psi:,x_3^{t+1}/|\psi:,x_3^{t+1}|)$, where $\psi:,x_3^{t+1}$ is column $x_3^{t+1}$ of $\psi_B$ $x_5^{t+1} \sim p(x_5 | x_6^t) = \mathrm{Categorical}(\psi x_6^t,:/|\psi x_6^t,:|)$, where $\psi x_6^t$, is row $x_6^t$ of $\psi_C$ $x_6^{t+1} \sim p(x_6 | x_5^{t+1}) = \mathrm{Categorical}(\psi:,x_5^{t+1}/|\psi:,x_5^{t+1}|)$, where $\psi:,x_5^{t+1}$ is column $x_5^{t+1}$ of $\psi_C$ In some embodiments, the t represents the time. In some embodiments, T is at least 1, 2, 3, 4, 5, 6, 7, 8, 9, 10, or greater. In other embodiments, T is at most 10, 9, 8, 7, 6, 5, 4, 3, 2, 1, or less. In some embodiments, categorical is a categorical distribution, which is a discrete probability distribution that describes the possible results of a random variable that can take on one of multiple possible categories, with the probability of each category separately specified. In some embodiments, the categorical distribution is the generalization of the Bernoulli distribution for a categorical random variable, i.e. for a discrete variable with more than two possible outcomes, such as the roll of a die. On the other hand, the categorical distribution is a special case of the multinomial distribution, in that it gives the probabilities of potential outcomes of a single drawing rather than multiple drawings. In some embodiments, the distribution of $x_1^{t+1}$ is $p(x_1 | x_2^t)$, which shows the likelihood of $x_1$ under the condition of $x_2^t$. In some embodiments, $x_2^t$ means a row of the heatmap $\Psi_A$ at the time t. In some embodiments, the distribution of $x_2^{t+1}$ is $p(x_2 | x_1^{t+1})$, which shows the likelihood of $x_2$ under the condition of $x_1^{t+1}$. In some embodiments, $x_1^{t+1}$ means a column of the heatmap $\Psi_A$ at the time t+1. In some embodiments, the distribution of $x_3^{t+1}$ is $p(x_3 | x_4^t)$, which shows the likelihood of $x_3$ under the condition of $x_4^t$. In some embodiments, $x_4^t$ means a row of the heatmap $\Psi_B$ at the time t. In some embodiments, the distribution of $x_3^{t+1}$ is $p(x_4 | x_3^{t+1})$, which shows that the likelihood of $x_4$ under the condition of $x_3^{t+1}$. In some embodiments, $x_3^{t+1}$ means a column of the heatmap $\Psi_B$ at the time t+1. In some embodiments, the distribution of $x_5^{t+1}$ is $p(x_5 | x_6^t)$, which shows the likelihood of $x_5$ under the condition of $x_6^t$. In some embodiments, $x_6^t$ means a row of the heatmap $\Psi_C$ at the time t. In some embodiments, the distribution of $x_6^{t+1}$ is $p(x_6|x_5^{t+1})$, which shows the likelihood of $x_6$ under the condition of $x_5^{t+1}$. In some embodiments, $x_5^{t+1}$ means a column of the heatmap $\Psi_C$ at the time t+1.

After the above three steps, expectation value and covariance value may be calculated. The equations for calculating expectation value and covariance value may be $$\mu_{f_B} = E[f(x_t)] = \frac{1}{T}\sum_{t=1}^{T} f(x^t), \text{ where}$$

$$f(x^t) = \arccos\left(\frac{(x_A - x_B)(x_C - x_D)}{|x_A - x_B||x_C - x_D|}\right), \text{ and}$$

$$\sigma = E[(f(x_t) - E[f(x_t)])^2].$$

Approximating PDF for Functions of Locations of Objects of Interest from Multi-Frame Heatmaps In some embodiments, the proposed framework can be applied to explore the relationships between different heatmaps. In some embodiments, the number of different heatmaps is at least 1, 2, 3, 4, 5, 6, 7, 8, 9, 10, or greater. In other embodiments, the number of different heatmaps is at most 10, 9, 8, 7, 6, 5, 4, 3, 2, 1, or less. In some embodiments, the relationships between different heatmaps can be represented by a function. In some embodiments, the function is relevant to the locations of one or more devices. In this situation, the function may represent the movement of the device at different times, the relative location of two or more devices at the different times, or the ratio of usage of one or more devices at the different times. In some embodiments, the function is relevant to one or more organs of a same subject. In this situation, the function may represent the distance between different organs at different times. In some embodiments, the function is relevant to one or more organs of different subject. In this situation, the function may represent the distance between different organs of different subjects at different times, the relationship between different subjects at different times, and the proximity of different subjects at different times. In some embodiments, the function is relevant to locations of small units of ordinary matter. In this situation, the function may present the movement of small units of ordinary matter at different times, or the relative locations of small units of ordinary matter at different times.

In the illustrated example of approximating PDF for joint angles, a reasonable assumption that joint locations should not deviate largely between adjacent frames may be made. Under this assumption, a Gaussian distributed heatmap may be overlaid on top of heatmap of the multiple-frame heatmaps.

Figure 4:
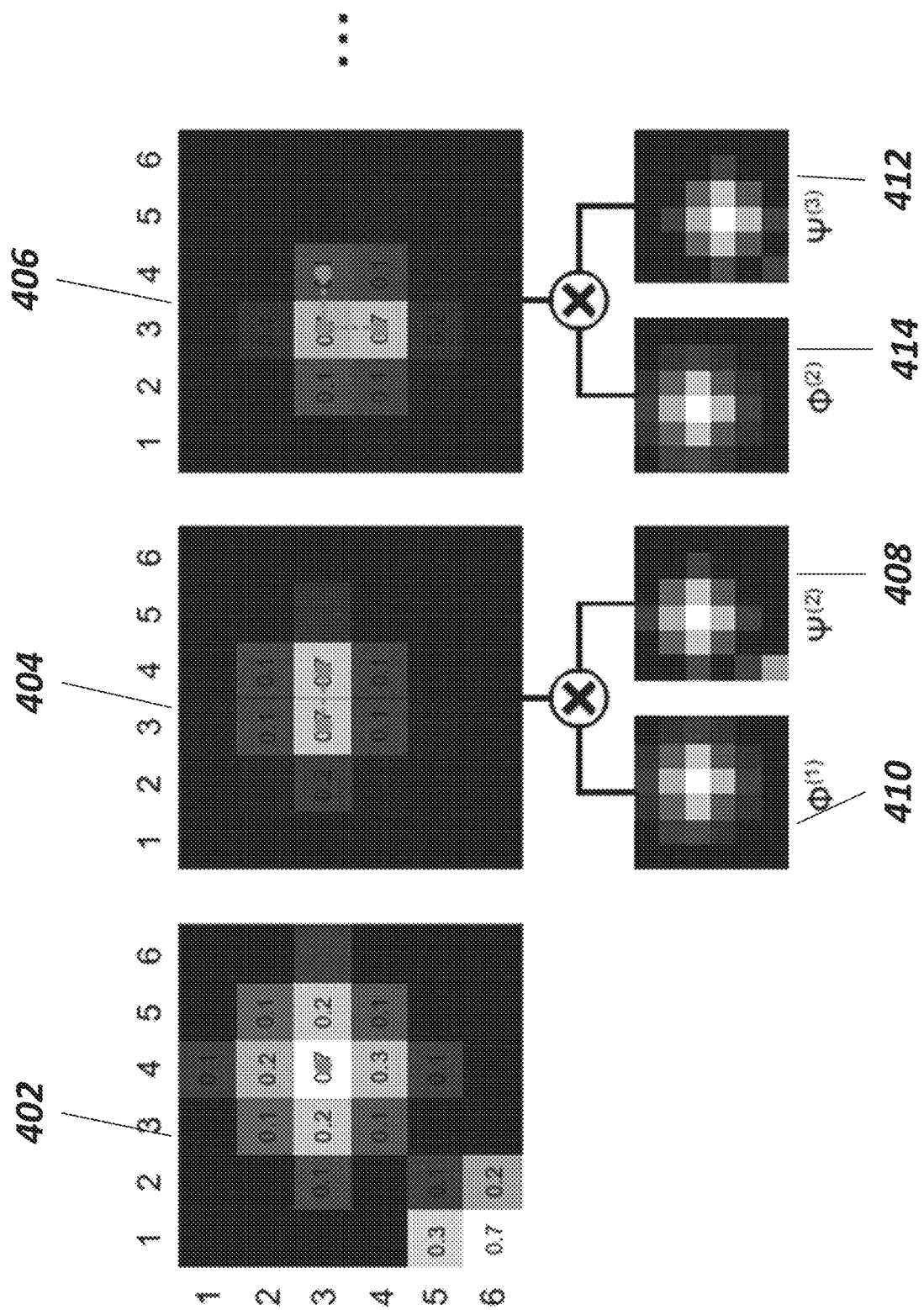
FIG. 4 demonstrates an example of the process of approximating a probability distribution function (PDF) for a joint angle from multi-frame heatmaps for a single joint.

FIG. 4 demonstrates an example of the process of approximating a PDF for a joint angle from multi-frame heatmaps for single-joint case. All of the heatmaps in FIG. 4 (402, 404, 406, etc.) represent different heatmaps at different times. In a first heatmap 402, a joint location $x^1$=[3 4] is sampled using the same method described above. In a second heatmap 404, each element of heatmap $\Psi^2$ 408 is multiplied by Gaussian heatmap $\Phi^1$ 410. The Gaussian heatmap $\Phi^1$ 410 may have mean x and a constant variance. The Gaussian heatmap $\Phi^1$ 410 may be derived from the first heatmap 402. In a third heatmap 406, each element of $\Psi^3$ 412 is multiplied by Gaussian heatmap $\Phi^2$ 414. The Gaussian heatmap $\Phi^2$ 414 may be derived from the first heatmap 404. The Gaussian heatmap $\Phi^2$ 414 may have mean x and a constant variance. In some embodiments, this process is repeated until the last frame.

Using the Approximated Distributions in a Bayesian Framework

In some embodiments, the approximated functions are used in a Bayesian framework. In some embodiments, a Gaussian process is used. The Gaussian process may be a stochastic process (a collection of random variables indexed by time or space), such that every finite collection of those random variables has a multivariate normal distribution. The distribution of a Gaussian process is the joint distribution of all those random variables and is a distribution over functions with a continuous domain. In some embodiments, Gaussian processes are applied to different stages of the statistical modelling process.

In some embodiments, the samples generated by the method disclosed herein can serve as both input and output for a Gaussian process regressor (GPR), which, for example, is described in RASMUSSEN, C. E. Gaussian processes in machine learning. In Advanced lectures on machine learning. Springer, 2004, pp. 63-71. In some embodiments, a Gaussian process model specifies a Gaussian prior over the joint distribution of an arbitrary combination of function value, y=[y(x$_1$), . . . , y(x$_N$)]~N(y|0, K), where X={x}$_{i=1}^N$ is a set of input data points and K is a Gram matrix, evaluated using a kernel function k(x, x') for each pair of input points.

Adding Gaussian noise to the outputs $z_i=y_i+\epsilon$, $\epsilon\sim N(0, \beta^{-1})$ the conditional distribution p(z|y)=N(z|y, $\beta^{-1}$J) and a marginal distribution that can be used to estimate model's hyperparameters p(z)=∫p(z|y)p(y)dy=N(z|0, C) can be obtained.

For example, to model the joint angles computed by methods described elsewhere herein—M={($\mu^1$, $\sigma^1$), . . . , ($\mu^N$, $\sigma^N$)} with respect to time T={1, . . . , N} (N is the number of frames)—a special kernel that takes into account output uncertainty can be used. In some embodiments, the special kernel is k($\mu_i$, $\mu_j$)=k$_{RBF}$($\mu_i$, $\mu_j$)+$\delta_{ij}\lambda\sigma_i$, where k$_{RBF}$ is a RBF kernel, $\lambda$ is a parameter and $\delta_{ij}$=1 if i=j and is 0 otherwise.

Figure 5A:
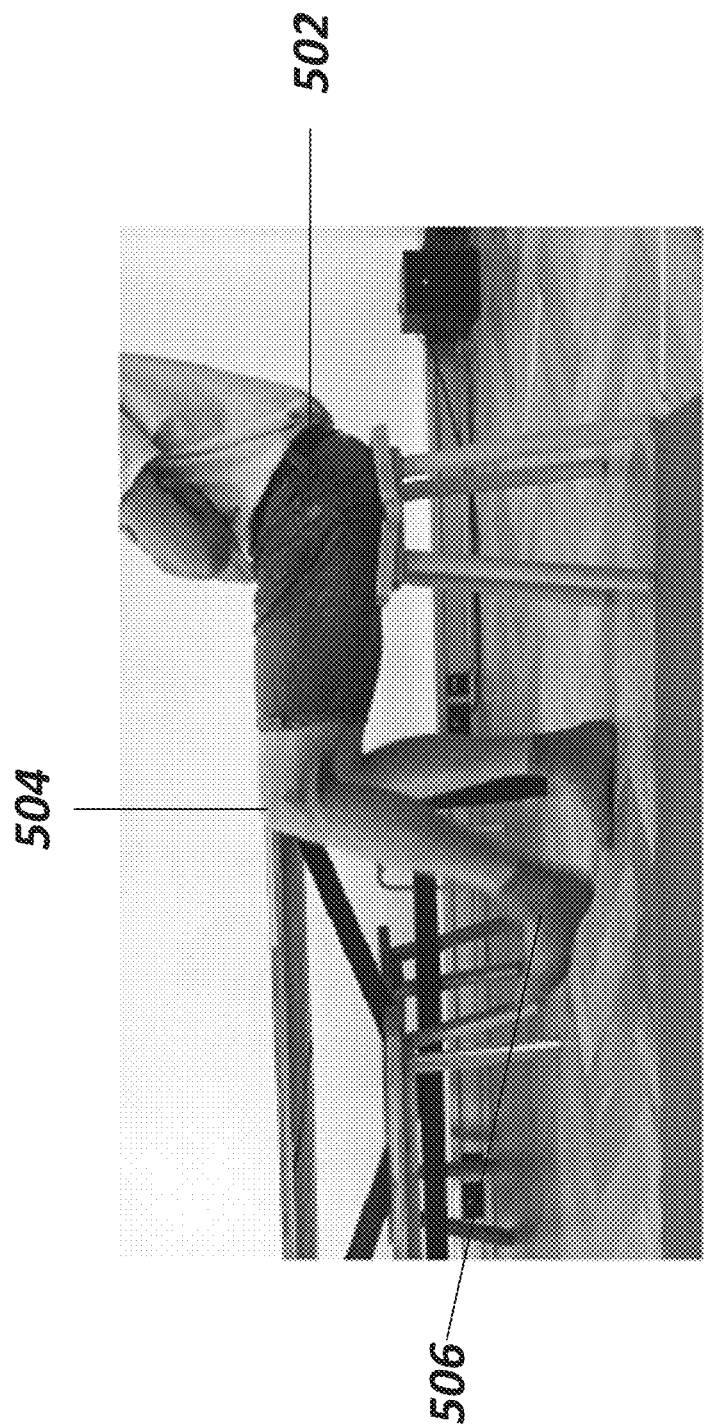
FIG. 5A shows an example of a video of a subject performing a leg exercise.
Figure 5B:
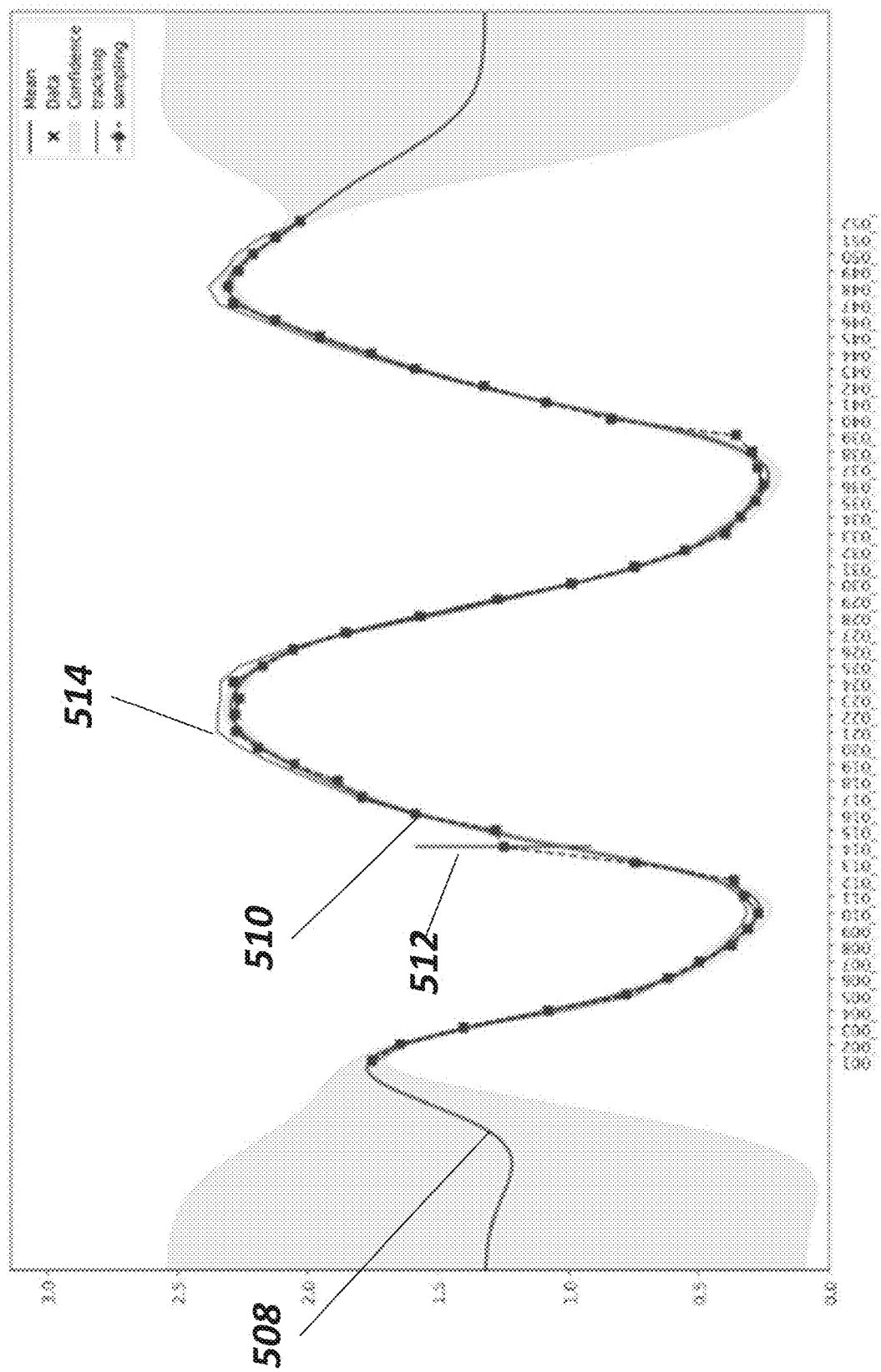
FIG. 5B shows examples of actual results of applying a Gaussian process regressor (GPR) with a kernel on a real-world video.

FIGS. 5A-5B represent the Gaussian process regression with known output variance. FIG. 5A shows an example of a video of a subject performing a leg exercise. In this figure, the subject is moving the left leg. The joins of interest are hip joints 502, knee joints 504, and ankle joints 506. FIG. 5B shows graphs of the left knee's joint angle across time. The FIG. 5B shows examples of actual results of applying GPR with the above kernel on a real-world video. In this figure, the line 508 shows the predictive means of joint angles, the multiple dots, such as, for example, dot510, are the samples i with vertical lines 512 proportional to values $\sigma_i$. Line 514 shows the joint angles computed using markers on the subject.

Alternatively, samples X={(x$_1$, $\Sigma_1$, . . . , (x$_N$, $\Sigma_N$)} (computed with the method disclosed elsewhere herein) can be used as inputs and actual joint angles can be used as outputs. The Gaussian processes, for example, are introduced in papers DAMIANOU, A. C., TITSIAS, M. K., AND LAWRENCE, N. D. Variational inference for latent variables and uncertain inputs in gaussian processes. *The Journal of Machine Learning Research* 17, 1 (2016), 1425-1486 and MCHUTCHON, A., AND RASMUSSEN, C. E. Gaussian process training with input noise. In *Advances in Neural Information Processing Systems* (2011), pp. 1341-1349. The Gaussian processes can be used to model datasets with uncertain inputs.

Computer-Based Method

Figure 6:
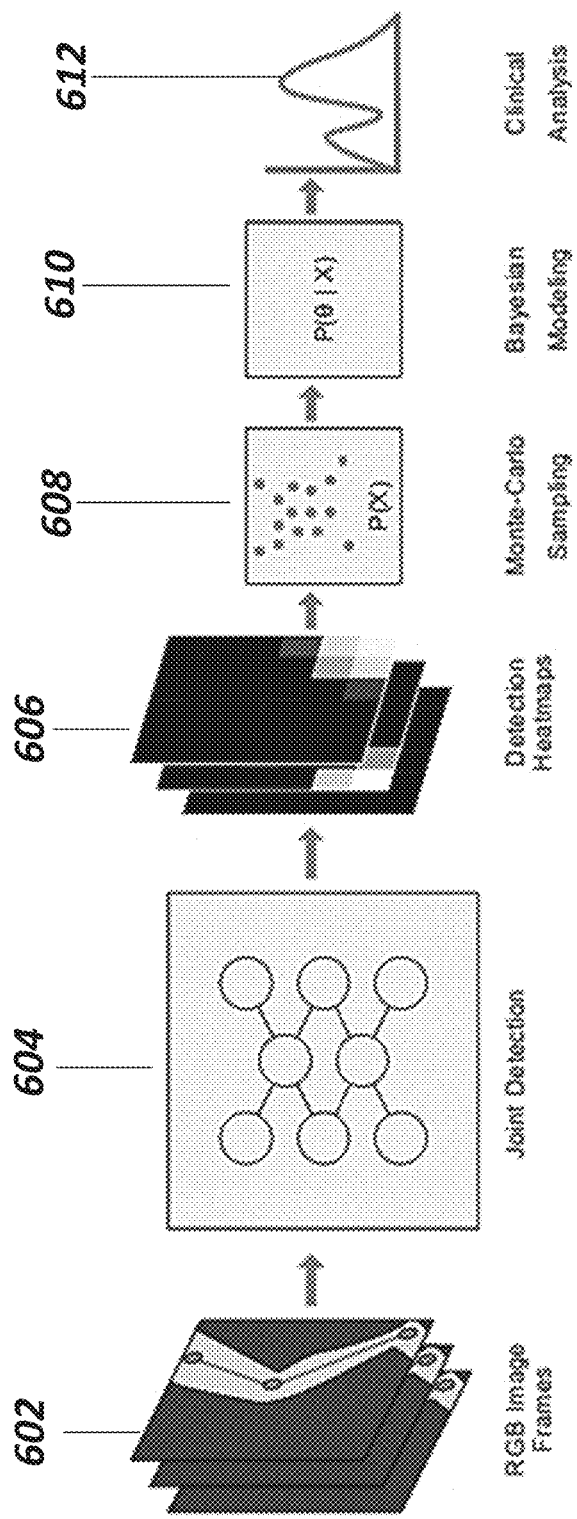
FIG. 6 shows an example of a computer-based method for locating a factor of interest within a video comprising a plurality of frames.

FIG. 6 shows an example of a computer-based method for locating an object of interest or factor of interest within a video comprising a plurality of frames. In some embodiments, the method comprises: inputting the video 602 into a machine learning algorithm 604; generating a heatmap 606 from a frame of the plurality of frames with the machine learning algorithm, wherein the heatmap provides a likelihood of a presence of the object of interest or factor of interest at each of a plurality of locations within the frame; and analyzing the heatmap using a statistical technique 608 and 610 thereby locating 612 the object of interest or factor of interest within the video. In the FIG. 6, the statistical techniques may comprise Monte Carlo sampling 608 and Bayesian modeling 610.

Figure 7:
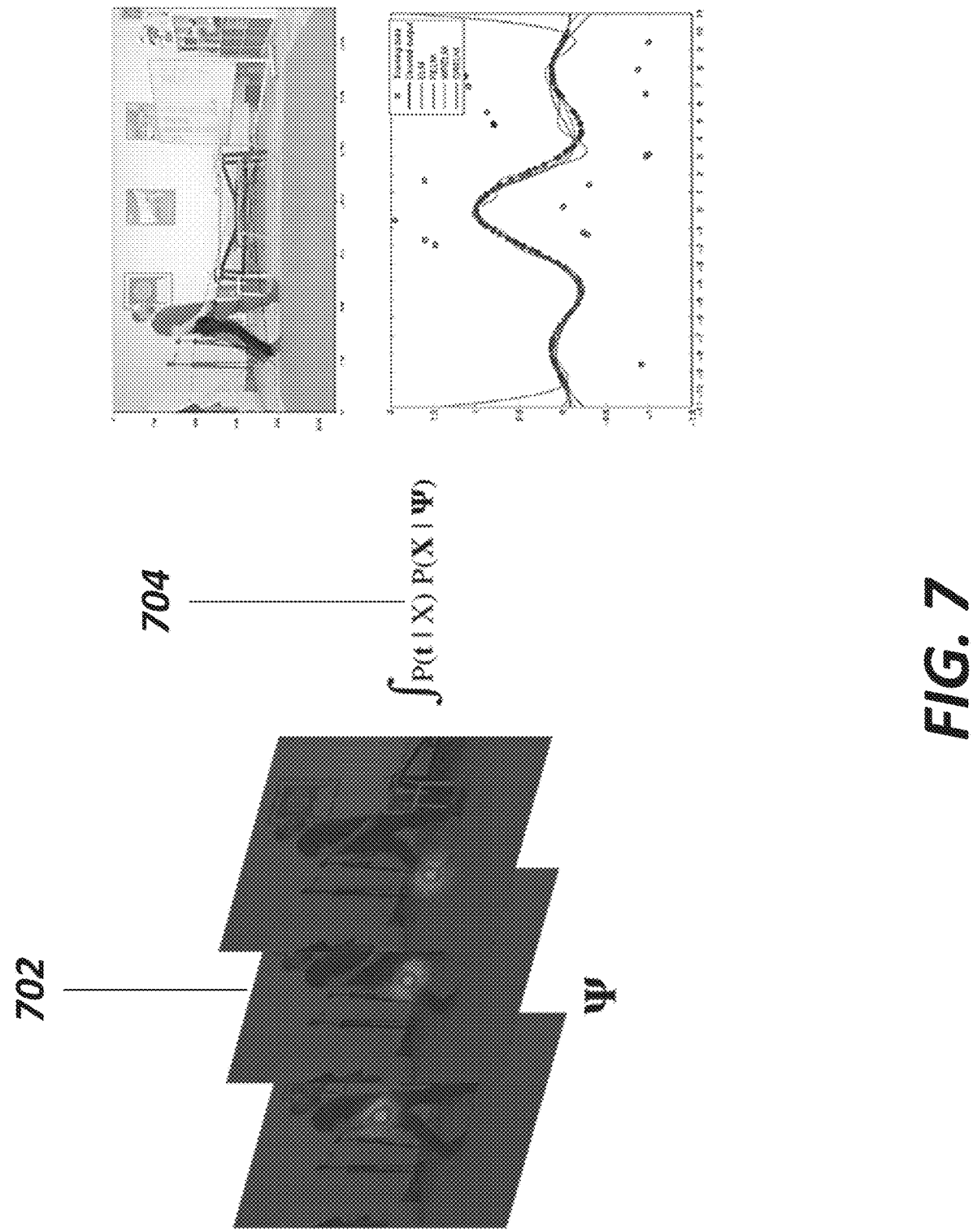
FIG. 7 shows an example of a feature map used to construct a probabilistic model.

FIG. 7 shows an example that the heatmaps can be used to construct a probabilistic model. The heatmaps can be generated through a plurality of video frames 702. The heatmap can be used as proposal distributions. After Monte Carlo sampling, the heatmaps can be used to construct complex probabilistic models 704 over arbitrary factors.

Figure 8:
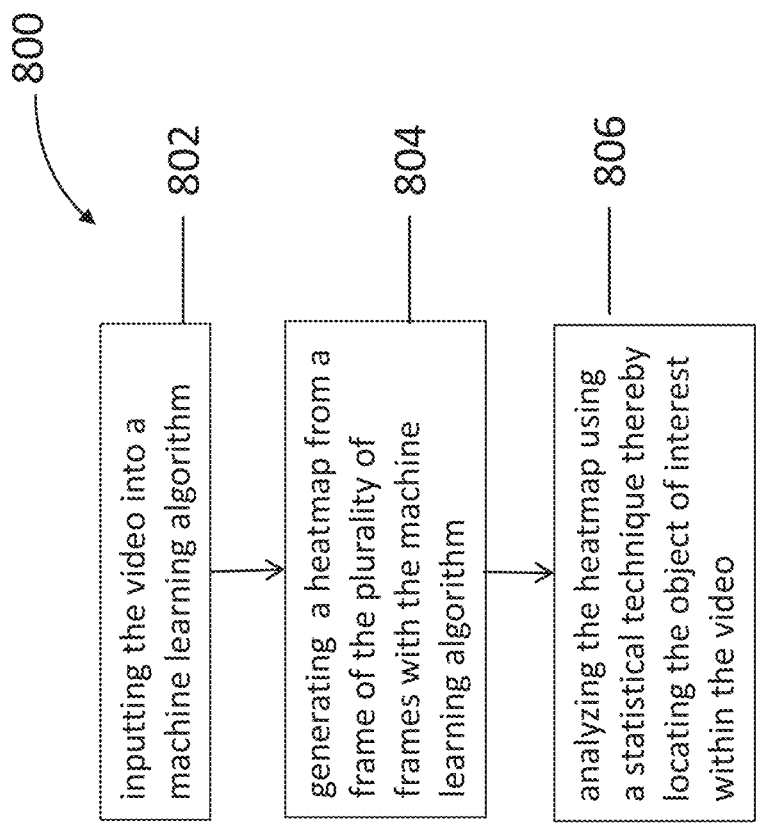
FIG. 8 shows an exemplary embodiment of a method for identifying an object of interest or a factor of interest within a video comprising a plurality of frames.

FIG. 8 shows an exemplary embodiment of a method 800 for locating an object of interest or factor of interest within a video comprising a plurality of frames. In a step 802 a video is inputted into a machine learning algorithm. In a step 804, the machine learning algorithm is used to generate a heatmap from a frame of the plurality of frames. In a step 806, a statistical technique is employed to analyze the heatmap to locate the object of interest or factor of interest within the video.

Figure 9:
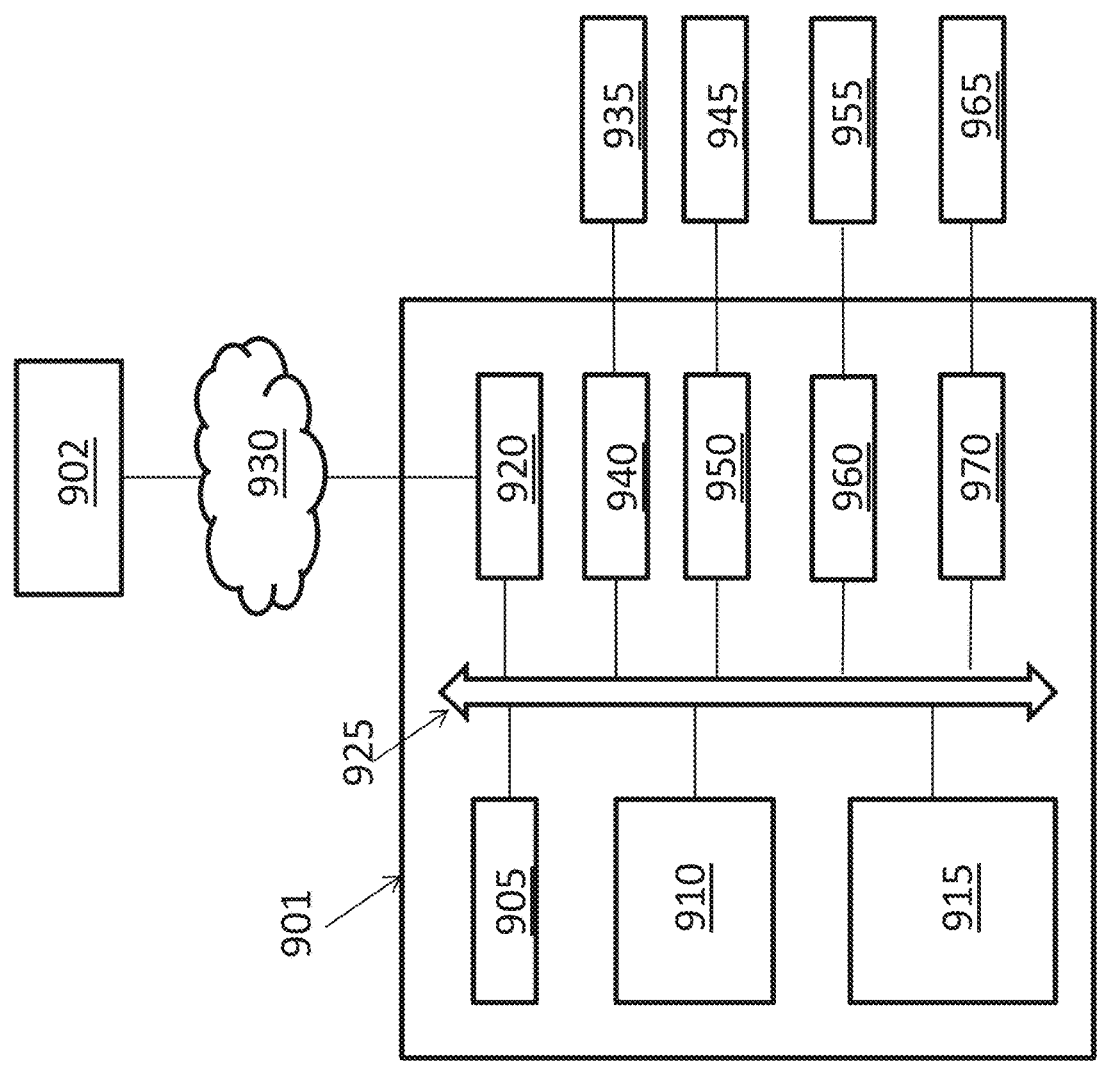
FIG. 9 shows an exemplary embodiment of a system as described herein comprising a device such as a digital processing device.

FIG. 9 shows an exemplary embodiment of a system as described herein comprising a device such as a digital processing device 901. The digital processing device 901 includes a software application configured to monitor the physical parameters of an individual. The digital processing device 901 may include a central processing unit ("CPU," also "processor" and "computer processor" herein) 905, which can be a single-core or multi-core processor, or a plurality of processors for parallel processing. The digital processing device 901 also includes either memory or a memory location 910 (e.g., random-access memory, read-only memory, flash memory), electronic storage unit 915 (e.g., hard disk), communication interface 920 (e.g., network adapter, network interface) for communicating with one or more other systems, and peripheral devices, such as a cache. The peripheral devices can include storage device(s) or storage medium(s) 965 which communicate with the rest of the device via a storage interface 970. The memory 910, storage unit 915, interface 920 and peripheral devices are configured to communicate with the CPU 905 through a communication bus 925, such as a motherboard. The digital processing device 901 can be operatively coupled to a computer network ("network") 930 with the aid of the communication interface 920. The network 930 can comprise the Internet. The network 930 can be a telecommunication and/or data network.

The digital processing device 901 includes input device(s) 945 to receive information from a user, the input device(s) in communication with other elements of the device via an input interface 950. The digital processing device 901 can include output device(s) 955 that communicates to other elements of the device via an output interface 960.

The CPU 905 is configured to execute machine-readable instructions embodied in a software application or module. The instructions may be stored in a memory location, such as the memory 910. The memory 910 may include various components (e.g., machine readable media) including, by way of non-limiting examples, a random-access memory ("RAM") component (e.g., a static RAM "SRAM", a dynamic RAM "DRAM, etc.), or a read-only (ROM) component. The memory 910 can also include a basic input/output system (BIOS), including basic routines that help to transfer information between elements within the digital processing device, such as during device start-up, may be stored in the memory 910.

The storage unit 915 can be configured to store files, such as health or risk parameter data (e.g., individual health or risk parameter values, health or risk parameter value maps, value groups, movement of individuals, and individual medical histories). The storage unit 915 can also be used to store operating system, application programs, and the like. Optionally, storage unit 915 may be removably interfaced with the digital processing device (e.g., via an external port connector (not shown)) and/or via a storage unit interface. Software may reside, completely or partially, within a computer-readable storage medium within or outside of the storage unit 915. In another example, software may reside, completely or partially, within processor(s) 905.

Information and data can be displayed to a user through a display 935. The display is connected to the bus 925 via an interface 940, and transport of data between the display other elements of the device 901 can be controlled via the interface 940.

Methods as described herein can be implemented by way of machine (e.g., computer processor) executable code stored on an electronic storage location of the digital processing device 901, such as, for example, on the memory 910 or electronic storage unit 915. The machine executable or machine-readable code can be provided in the form of a software application or software module. During use, the code can be executed by the processor 905. In some cases, the code can be retrieved from the storage unit 915 and stored on the memory 910 for ready access by the processor 905. In some situations, the electronic storage unit 915 can be precluded, and machine-executable instructions are stored on memory 910.

In some embodiments, a remote device 902 is configured to communicate with the digital processing device 901, and may comprise any mobile computing device, non-limiting examples of which include a tablet computer, laptop computer, smartphone, or smartwatch. For example, in some embodiments, the remote device 902 is a smartphone of the user that is configured to receive information from the digital processing device 901 of the device or system described herein in which the information can include a summary, sensor data, or other data. In some embodiments, the remote device 902 is a server on the network configured to send and/or receive data from the device or system described herein.

Embodiments

In an aspect, a computer-based method for locating an object of interest or factor of interest within a video comprising a plurality of frames comprises: inputting the video into a machine learning algorithm; generating a heatmap from a frame of the plurality of frames with the machine learning algorithm, wherein the heatmap provides a likelihood of a presence of the object of interest or factor of interest at each of a plurality of locations within the frame; and analyzing the heatmap using a statistical technique thereby locating the object of interest or factor of interest within the video. In some embodiments, the number of the plurality of frames is at least 2, 3, 4, 5, 6, 7, 8, 9, 10, or greater. In other embodiments, the number of the plurality of frames is at most 10, 9, 8, 7, 6, 5, 4, 3, 2, or less. The video may be obtained through a device. The device may be an electronic device. The electronic device may comprise a portable electronic device. The electronic devices may be mobile phones, PCs, tablets, printers, consumer electronics, and appliances.

In some embodiments, the machine learning algorithm comprises a DNN. In some embodiments, the machine learning algorithm comprises decision tree learning, association rule learning, ANN, inductive logic programming, support vector machines, clustering, Bayesian networks, reinforcement learning, representation learning, similarity and metric learning, sparse dictionary learning, genetic algorithm, and rule-based machine learning.

In some embodiments, the heatmap comprises data from hidden layers of the DNN. In some embodiments, the number of the hidden layers is at least 1, 2, 3, 4, 5, 6, 7, 8, 9, 10, or greater. In other embodiments, the number of the hidden layers is at most 10, 9, 8, 7, 6, 5, 4, 3, 2, 1, or less.

In some embodiments, the DNN comprises VGG-19. In some embodiments, the VGG-19 comprises 19 convolutional layers with uniform architecture. In some embodiments, the DNN comprises VGG-16, AlexNet, ZFNet, GoogleNet/Inception, MobileNet, and ResNet.

In some embodiments, the heatmap identifies a likelihood that multiple objects of interest are located at locations within the frame. The multiple objects of interest may comprise joints of a subject, cars, tracing devices, sensors, and people of interest.

In some embodiments, the statistical technique comprises Monte Carlo Sampling. In some embodiments, the Monte Carlo Sampling is used to sample the likelihood of the presence of the object of interest or factor of interest for at least one of each of the plurality of locations within the frame. In some embodiments, the Monte Carlo Sampling is used to sample the likelihood of the presence of the object of interest or factor of interest for at least 2, 3, 4, 5, 6, or greater of each of the plurality of locations within the frame.

In some embodiments, the statistical technique further comprises Bayesian modeling. In some embodiments, the Bayesian modeling is used to model a change in a location of the object of interest or factor of interest within the frame to a different location of the object of interest or factor of interest within a different frame of the plurality of frames. In some embodiments, the Bayesian Modeling represents a set of variables and their conditional dependencies. In some embodiments, the number of variables is at least about 1, 2, 3, 4, 5, 6, 7, 8, 9, 10, or greater. In other embodiments, the number of variables is at most about 10, 9, 8, 7, 6, 5, 4, 3, 2, 1, or less In some embodiments, the method comprises identifying a position of the object of interest or factor of interest within the frame relative to a different object of interest or factor of interest within the frame. In some embodiments, the position of the object of interest or factor of interest within the frame is expressed as an angle. In other embodiments, the position of the object of interest or factor of interest within the frame is expressed as a distance, a ratio, a code, or a function.

In some embodiments, the object of interest or factor of interest comprises a joint of a body of an individual. In some embodiments, the joints comprise hand joints, elbow joints, wrist joints, axillary articulations, stemoclavicular joints, vertebral articulations, temporomandibular joints, sacroiliac joints, hip joints, knee joints, and articulations of foot. In some embodiments, the joint comprises a shoulder, elbow, hip, knee, or ankle.

In some embodiments, the video captures the individual within the frame. In some embodiments, the video captures movement of the joint from the frame to a different frame within the plurality of frames. In some embodiments, the movement of the joint from the frame to a different frame within the plurality of frames is measured relative to a different joint of the body of the individual and is expressed as an angle. In some embodiments, the angle is used by a healthcare provider to evaluate the individual.

In an aspect, a computer based system for locating an object of interest or factor of interest within a video comprising a plurality of frames comprises a processor; a non-transitory medium comprising a computer program configured to cause the processor to: input the video into a machine learning algorithm; generate a heatmap from a frame of the plurality of frames using the machine learning algorithm, wherein the heatmap provides a likelihood of a presence of the object of interest or factor of interest at each of a plurality of locations within the frame; and analyze the heatmap using a statistical technique thereby locating the object of interest or factor of interest within the video. In some embodiments, the processor comprises a central processing unit ("CPU"), which can be a single-core or multi-core processor, or a plurality of processors for parallel processing.

In some embodiments, the computer-based system further comprises one or more non-transitory computer readable storage media encoded with a program including instructions executable by the operating system to process image or video data. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Typically the computer-based system includes and/or utilizes one or more databases. In view of the disclosure provided herein, those of skill in the art will recognize that many databases are suitable for storage and retrieval of baseline datasets, files, file systems, objects, systems of objects, as well as data structures and other types of information described herein. In various embodiments, suitable databases include, by way of non-limiting examples, relational databases, non-relational databases, object-oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

In some embodiments, the machine learning algorithm comprises a DNN. In some embodiments, the machine learning algorithm comprises decision tree learning, association rule learning, ANN, inductive logic programming, support vector machines, clustering, Bayesian networks, reinforcement learning, representation learning, similarity and metric learning, sparse dictionary learning, genetic algorithm, and rule-based machine learning.

In some embodiments, the heatmap comprises data from hidden layers of the DNN. In some embodiments, the number of the hidden layers is at least 2, 3, 4, 5, 6, 7, 8, 9, 10, or greater. In other embodiments, the number of the hidden layers is at most 10, 9, 8, 7, 6, 5, 4, 3, 2, or less.

In some embodiments, the DNN comprises VGG-19. In some embodiments, the VGG-19 comprises 19 convolutional layers with uniform architecture. In some embodiments, the DNN comprises VGG-16, AlexNet, ZFNet, GoogleNet/Inception, MobileNet, and ResNet.

In some embodiments, the heatmap identifies a likelihood that multiple objects of interest are located at locations within the frame. The multiple objects of interest may comprise joints of a subject, cars, tracing devices, sensors, and a person of interest.

In some embodiments, the statistical technique comprises Monte Carlo Sampling. In some embodiments, the Monte Carlo Sampling is used to sample the likelihood of the presence of the object of interest or factor of interest for at least one of each of the plurality of locations within the frame. In some embodiments, the Monte Carlo Sampling is used to sample the likelihood of the presence of the object of interest or factor of interest for at least 2, 3, 4, 5, 6, or greater of each of the plurality of locations within the frame.

In some embodiments, the statistical technique further comprises Bayesian modeling. In some embodiments, the Bayesian modeling is used to model a change in a location of the object of interest or factor of interest within the frame to a different location of the object of interest or factor of interest within a different frame of the plurality of frames. In some embodiments, the Bayesian modeling represents a set of variables and their conditional dependencies. In some embodiments, the number of variables is at least about 1, 2, 3, 4, 5, 6, 7, 8, 9, 10, or greater. In other embodiments, the number of variables is at most about 10, 9, 8, 7, 6, 5, 4, 3, 2, 1, or less.

In some embodiments, the computer program is further configured to cause the processor to identify a position of the object of interest or factor of interest within the frame relative to a different object of interest or factor of interest within the frame. In some embodiments, the position of the object of interest or factor of interest within the frame within the frame is expressed as an angle. In other embodiments, the position of the object of interest or factor of interest within the frame is expressed as a distance, a ratio, a code, or a function.

In some embodiments, the object of interest or factor of interest comprises a joint of a body of an individual. In some embodiments, the joints comprise hand joints, elbow joints, wrist joints, axillary articulations, sternoclavicular joints, vertebral articulations, temporomandibular joints, sacroiliac joints, hip joints, knee joints, and articulations of foot. In some embodiments, the joint comprises a shoulder, elbow, hip, knee, or ankle.

In some embodiments, the joint comprises a shoulder, elbow, hip, knee, or ankle. In some embodiments, the video captures the individual within the frame. In some embodiments, the video captures movement of the joint from the frame to a different frame within the plurality of frames. In some embodiments, the movement of the joint from the frame to a different frame within the plurality of frames is measured relative to a different joint of the body of the individual and is expressed as an angle. In some embodiments, the angle is used by a healthcare provider to evaluate the individual.

In another aspect, a non-transitory medium comprises a computer program configured to cause the processor to: input the video into a machine learning algorithm; generate a heatmap from a frame of the plurality of frames with the machine learning algorithm, wherein the heatmap provides a likelihood of a presence of the object of interest or factor of interest at each of a plurality of locations within the frame; and analyze the heatmap using a statistical technique thereby locating the object of interest or factor of interest within the video.

In some embodiments, the computer program includes a sequence of instructions, executable in the digital processing device's CPU, written to perform a specified task. Computer-readable instructions may be implemented as program modules, such as functions, objects, application programming interfaces (APIs), data structures, and the like, that perform particular tasks or implement particular abstract data types. In light of the disclosure provided herein, those of skill in the art will recognize that a computer program may be written in various versions of various languages. The functionality of the computer-readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer programs or applications. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one locations.

In some embodiments, the machine learning algorithm comprises a DNN. In some embodiments, the machine learning algorithm comprises decision tree learning, association rule learning, ANN, inductive logic programming, support vector machines, clustering, Bayesian networks, reinforcement learning, representation learning, similarity and metric learning, sparse dictionary learning, genetic algorithm, and rule-based machine learning.

In some embodiments, the heatmap comprises data from hidden layers of the DNN. In some embodiments, the number of the hidden layers is at least 2, 3, 4, 5, 6, 7, 8, 9, 10, or greater. In other embodiments, the number of the hidden layers is at most 10, 9, 8, 7, 6, 5, 4, 3, 2, or less.

In some embodiments, the DNN comprises VGG-19. In some embodiments, the VGG-19 comprises 19 convolutional layers with uniform architecture. In some embodiments, the DNN comprises VGG-16, AlexNet, ZFNet, GoogleNet/Inception, MobileNet, and ResNet.

In some embodiments, the heatmap identifies a likelihood that multiple objects of interest are located at locations within the frame. The multiple objects of interest may comprise joints of a subject, cars, tracing devices, sensors, and a person of interest.

In some embodiments, the statistical technique comprises Monte Carlo sampling. In some embodiments, the Monte Carlo sampling is used to sample the likelihood of the presence of the object of interest or factor of interest or factor of interest for at least one of each of the plurality of locations within the frame. In some embodiments, the Monte Carlo sampling is used to sample the likelihood of the presence of the object of interest or factor of interest or factor of interest for at least 2, 3, 4, 5, 6, or greater of each of the plurality of locations within the frame.

In some embodiments, the statistical technique further comprises Bayesian Modeling. In some embodiments, the Bayesian modeling is used to model a change in a location of the object of interest or factor of interest or factor of interest within the frame to a different location of the object of interest or factor of interest or factor of interest within a different frame of the plurality of frames. In some embodiments, the Bayesian Modeling represents a set of variables and their conditional dependencies. In some embodiments, the number of variables is at least about 1, 2, 3, 4, 5, 6, 7, 8, 9, 10, or greater. In other embodiments, the number of variables is at most about 10, 9, 8, 7, 6, 5, 4, 3, 2, 1, or less.

In some embodiments, the computer program is further configured to cause the processor to identify a position of the object of interest or factor of interest within the frame relative to a different object of interest or factor of interest within the frame. In some embodiments, the position of the object of interest or factor of interest within the frame within the frame is expressed as an angle. In other embodiments, the position of the object of interest or factor of interest within the frame is expressed as a distance, a ratio, a code, or a function.

In some embodiments, the object of interest or factor of interest comprises a joint of a body of an individual. In some embodiments, the joints comprise hand joints, elbow joints, wrist joints, axillary articulations, stemoclavicular joints, vertebral articulations, temporomandibular joints, sacroiliac joints, hip joints, knee joints, and articulations of foot. In some embodiments, the joint comprises a shoulder, elbow, hip, knee, or ankle.

In some embodiments, the joint comprises a shoulder, elbow, hip, knee, or ankle. In some embodiments, the video captures the individual within the frame. In some embodiments, the video captures movement of the joint from the frame to a different frame within the plurality of frames. In some embodiments, the movement of the joint from the frame to a different frame within the plurality of frames is measured relative to a different joint of the body of the individual and is expressed as an angle. In some embodiments, the angle is used by a healthcare provider to evaluate the individual.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practising the invention. It is intended that the following claims define the scope of the invention and that methods and structures within the scope of these claims and their equivalents be covered thereby.

What is claimed is:

1. A computer-implemented method for evaluating a joint of an individual, the method comprising:
    (a) inputting a video of the individual comprising a plurality of frames into a software module, wherein the software module comprises Monte Carlo sampling;
    (b) identifying the joint of the individual within the video with the software module;
    (c) locating the joint at one or more times in the video with the software module, wherein locating the joint comprises using the Monte Carlo sampling to generate sample locations of the joint, wherein the Monte Carlo sampling comprises
        (i) generating draws from a probability distribution characterizing the joint, wherein the probability distribution is parameterized by at least a frame of the plurality of frames; and
        (ii) calculating one or more expectation values characterizing the joint from the draws from the probability distribution;
    (d) measuring an angle of the joint at one or more times in the video with the software module; and
    (e) assessing the joint based on the measurement of the previous step.

2. The method of claim 1, wherein the joint comprises a shoulder, elbow, hip, knee, or ankle.

3. The method of claim 1, wherein the probability distribution comprises a categorical distribution.

4. The method of claim 1, wherein the one or more expectation values comprises a mean angle of the joint.

5. The method of claim 1, wherein the one or more expectation values comprises a mean angle of the joint and a variance of the joint.

6. The method of claim 1, further comprising generating a function describing the angle of the joint over time with the software module.

7. The method of claim 6, wherein the software module comprises Bayesian analysis, and wherein the Bayesian analysis generates the function describing the angle of the joint over time.

8. The method of claim 7, wherein the Bayesian analysis comprises Gaussian process regression.

9. The method of claim 8, wherein inputs to the Gaussian process regression comprise the angle of the joint.

10. The method of claim 1, wherein the software module comprises a deep neural network.

11. The method of claim 10, wherein the deep neural network comprises at least one of VGG-19, ResNet, Inception, and MobileNet.

12. A computer-based system for evaluating a joint of an individual, the system comprising:
    (a) a processor;
    (b) a non-transitory computer-readable medium comprising a computer program configured to direct the processor to:
        (i) input a video of the individual comprising a plurality of frames into a software module, wherein the software module comprises Monte Carlo sampling;
        (ii) identify the joint of the individual within the video with the software module;
        (iii) locate the joint at one or more times in the video with the software module, wherein the Monte Carlo sampling is used to locate the joint by generating sample locations of the joint, wherein the Monte Carlo sampling comprises (1) generating draws from a probability distribution characterizing the joint, wherein the probability distribution is parameterized by at least a frame of the plurality of frames; and
(2) calculating one or more expectation values characterizing the joint from the draws from the probability distribution; and
(iv) measure an angle of the joint at one or more times in the video with the software module.

13. The system of claim 12, wherein the measurement of the angle of the joint is assessed by a healthcare provider.

14. The system of claim 12, wherein the joint comprises a shoulder, elbow, hip, knee, or ankle.

15. The system of claim 12, wherein the probability distribution comprises a categorical distribution.

16. The system of claim 12, wherein the one or more expectation values comprises a mean angle of the joint.

17. The system of claim 12, wherein the one or more expectation values comprises a mean angle of the joint and a variance of the joint.

18. The system of claim 12, wherein the computer program further directs the processor to generate a function describing the angle of the joint over time.

19. The system of claim 18, wherein the function is generated using Bayesian analysis.

20. The system of claim 19, wherein the Bayesian analysis comprises Gaussian process regression.

21. The system of claim 20, wherein inputs to the Gaussian process regression comprise the angle of the joint.

22. The system of claim 12, wherein the software module comprises a deep neural network.

23. The system of claim 22, wherein the deep neural network comprises at least one of VGG-19, ResNet, Inception, and MobileNet.

* * * * *